(12) United States Patent
Spiegl et al.

(10) Patent No.: US 12,071,940 B2
(45) Date of Patent: Aug. 27, 2024

(54) PACKAGING RING WITH RELIEF OPENING

(71) Applicant: Hoerbiger Wien GmbH, Vienna (AT)

(72) Inventors: Bernhard Spiegl, Vienna (AT); Andreas Kaufmann, Vienna (AT); Martin Lagler, Vienna (AT); Marian Janko-Grasslober, Vienna (AT); Matthias Kornfeld, Brunn/Geb. (AT)

(73) Assignee: Hoerbiger Wien GmbH, Vienna (AT)

( * ) Notice: Subject to any disclaimer, the term of this patent is extended or adjusted under 35 U.S.C. 154(b) by 427 days.

(21) Appl. No.: 17/427,022

(22) PCT Filed: Jan. 29, 2020

(86) PCT No.: PCT/EP2020/052180
§ 371 (c)(1),
(2) Date: Jul. 29, 2021

(87) PCT Pub. No.: WO2020/157141
PCT Pub. Date: Aug. 6, 2020

(65) Prior Publication Data
US 2022/0136494 A1  May 5, 2022

(30) Foreign Application Priority Data
Jan. 29, 2019  (AT) .............................. A 50069/2019

(51) Int. Cl.
*F16J 15/28*    (2006.01)
*F04B 39/00*    (2006.01)
*F04B 39/04*    (2006.01)

(52) U.S. Cl.
CPC ........ *F04B 39/041* (2013.01); *F04B 39/0022* (2013.01); *F04B 39/0094* (2013.01); *F16J 15/28* (2013.01)

(58) Field of Classification Search
CPC .... F04B 39/41; F04B 39/022; F04B 39/0094; F16J 15/28
See application file for complete search history.

(56) References Cited

U.S. PATENT DOCUMENTS

| 1,008,655 A | 11/1911 | Lewis et al. |
| 1,828,178 A | 10/1931 | Fox |

(Continued)

FOREIGN PATENT DOCUMENTS

| CH | 439897 A | 7/1967 |
| DE | 102012019166 A1 | 4/2014 |

(Continued)

*Primary Examiner* — Vishal A Patel
(74) *Attorney, Agent, or Firm* — Dykema Gossett PLLC

(57) ABSTRACT

Various embodiments of the present disclosure are directed to packing rings. In one example embodiment, a packing ring is disclosed including first and second axial ring ends, at least three ring segments, and at least three relief openings. The at least three relief openings each have a first relief opening end opening into the radially inside inner circumferential surface of the ring segment. The first relief opening ends of two relief openings arranged adjacent to one another in the circumferential direction are spaced apart from one another at a relief opening circumferential distance. The first relief opening ends are closer in the axial direction to the first axial ring end than to the second axial ring end and are spaced apart at a relief opening axial distance from the first axial ring end, which is 4% to 20% of the axial ring width of the ring segment.

18 Claims, 8 Drawing Sheets

(56) References Cited

U.S. PATENT DOCUMENTS

| | | | |
|---|---|---|---|
| 1,999,094 A | | 4/1935 | Godron |
| 3,305,241 A | | 2/1967 | Hart |
| 3,544,118 A | * | 12/1970 | Klein ..................... F16J 15/006 |
| | | | 277/927 |
| 3,915,459 A | * | 10/1975 | Kunderman ............ F01D 11/00 |
| | | | 277/411 |
| 4,301,893 A | | 11/1981 | St. Jean et al. |
| 4,408,767 A | * | 10/1983 | Kako .................... F03B 11/006 |
| | | | 277/937 |
| 2004/0227301 A1 | | 11/2004 | Wood et al. |
| 2009/0108535 A1 | * | 4/2009 | Lindner-Silwester ... F16J 15/26 |
| | | | 277/548 |
| 2012/0091667 A1 | | 4/2012 | Jordan |
| 2013/0147124 A1 | * | 6/2013 | Yang ......................... F16J 9/16 |
| | | | 277/460 |

FOREIGN PATENT DOCUMENTS

| | | |
|---|---|---|
| EP | 0995933 A2 | 4/2000 |
| GB | 191004082 A | 5/1910 |
| GB | 928749 A | 6/1963 |
| JP | H09196182 A | 7/1997 |
| JP | 2000291806 A | 10/2000 |
| JP | 2007231823 A | 9/2007 |
| KR | 101898141 B1 | 10/2018 |

\* cited by examiner

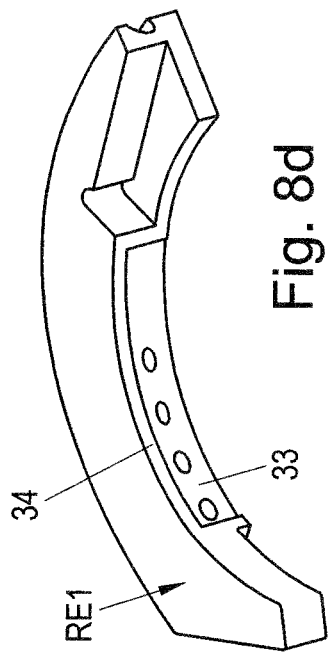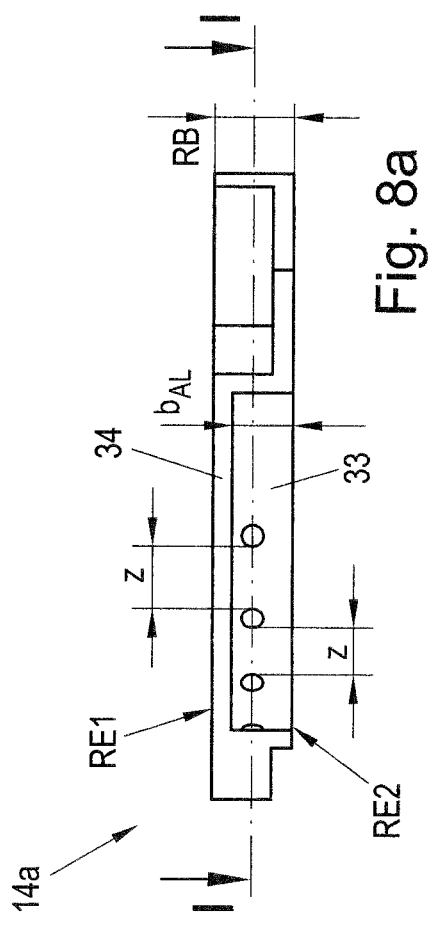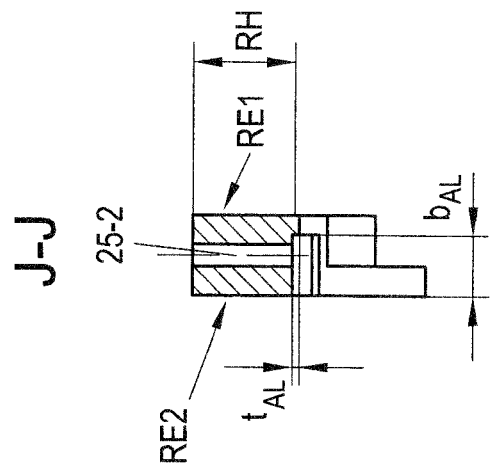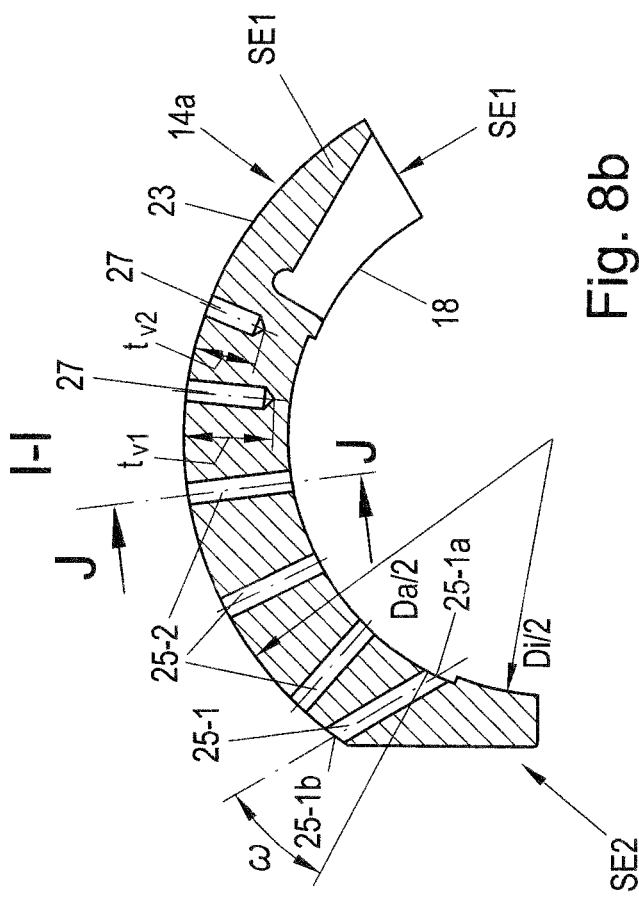

PACKAGING RING WITH RELIEF OPENING

CROSS-REFERENCE TO RELATED APPLICATIONS

This application is a national stage filing based upon International PCT Application No. PCT/EP2020/052180, filed 29 Jan. 2020, which claims the benefit of priority to Austria application No. A 50069/2019, filed 29 Jan. 2019.

BACKGROUND

The invention relates to a packing ring having at least three ring segments, each having a first segment end and a second segment end in the circumferential direction, wherein a first tangential contact surface of the first segment end of a ring segment abuts a second tangential contact surface of the second segment end of a ring segment adjoining it in the circumferential direction in order to create a radial seal of the packaging ring, and a first axial contact surface of the first segment end of a ring segment, facing toward a first axial ring end of the packing ring, abuts a second axial contact surface of the second segment end of a ring segment adjoining it in the circumferential direction and facing toward a second axial ring end of the packing ring in order to create an axial seal of the packing ring. The invention also relates to a sealing device for sealing a translationally oscillating piston rod having a housing in which a number of packing rings arranged axially in succession are provided, as well as a piston compressor having a compressor housing and at least one cylinder housing arranged thereon, in which a piston oscillates translationally.

Piston compressors in cross-head design, especially in double-action design, require the crank-side compression space in the cylinder, in which the (high) cylinder pressure is variable over time, to be sealed along the oscillating piston rod. This sealing is usually carried out against the (low) pressure prevailing in the crankcase, which essentially corresponds to the ambient pressure. The sealing elements that are used in such a seal are called packing rings and are arranged in a so-called pressure packing. The sealing elements can follow lateral movements of the piston rod to a certain extent without losing their sealing effect. To increase the service life and reliability of a pressure packing, multiple such packing rings are usually connected axially in series in a pressure packing. Such pressure packings or seals are sufficiently known from the prior art in greatly varying embodiments, for example from GB 928 749 A, U.S. Pat. No. 1,008,655 A, or EP 2 056 003 A1.

Due to the relative movement between the piston rod and the packing rings, the packing rings are subject to a certain amount of wear on the contact surfaces with the piston rod. This ring wear usually requires cut ring shapes that enable automatic continuous readjustment of the ring when material is removed at the contact surface ring/piston rod. For this purpose, radially and tangentially cut rings are usually used, which are inserted in pairs in the packing chambers of the pressure packing in order to mutually cover the joint gaps that occur to compensate for wear. Such radially/tangentially cut ring combinations are single-action seals that only seal in the direction of the cross head, while the radial cuts ensure that no higher pressure can be enclosed in the packing in the course of the crank-side re-expansion phase of the piston compressor. In the case of cut ring shapes, it is known that tube springs wound around the outer circumference are usually used, which press the packing rings against the piston rod even in the unpressurized state.

Especially at higher pressures, a significant extrusion of the packing rings into the gap formed between the piston rod and the packing housing or chamber disk can also occur in conventional arrangements. To avoid this extrusion as much as possible, additional metallic support rings that do not flatly touch the piston rod can be used between the ring on the low-pressure side and the chamber disk, as disclosed in U.S. Pat. No. 3,305,241 A, for example.

In the case of a combination of a radially and a tangentially cut packing ring, the sealing towards the piston rod takes place essentially only due to the tangentially cut packing ring, the ring segments of which can be pushed together due to the tangential cut and thus maintain the sealing effect. The radially cut packing ring is essentially only used to seal the wear gaps of the tangential packing ring in the axial and radial directions. The radial packing ring only wears until the ring segments lie against one another in the circumferential direction. The radially and tangentially cut packing rings thus wear differently. In order to prevent the radially and tangentially cut packing rings from twisting relative to one another, which can have the result that the wear gaps in the tangentially cut packing ring are no longer covered and consequently the sealing effect would be lost, a twist lock has to be provided between the rings. Such a twist lock is usually embodied as a pin which is inserted into associated recesses in the radially and tangentially cut packing ring. In EP 2 056 003 A1 it has therefore already been proposed not to provide a packing ring combination of a radially and a tangentially cut packing ring, but only a single packing ring which is cut both radially and also tangentially. As a result, the overall axial length of a pressure packing and therefore the entire seal can be reduced.

With increasing compression pressures of the compressor, the stress on the packing rings and thus also their wear increases. A known method of reducing the load on a segmented packing ring is to provide pressure compensation, as shown, for example, in EP 2 056 003 A1. The applied higher pressure is deliberately brought into the dynamic sealing surface (radially between packing ring and piston rod) and axially closer to the side facing away from the pressure (crankcase side) via one or more pressure compensation grooves extending in the circumferential direction. This reduces the surface pressure in the dynamic sealing surface, reduces friction, and increases the service life. The disadvantage here, however, is that this principle of pressure compensation may only be increased to a certain extent, since the remaining axial wall thickness on the packing ring is no longer sufficiently stable due to the pressure compensation groove(s) and the applied pressures can cause deformations and therefore leaks. Another disadvantage of highly pressure-compensated packing rings is that the rings are pressed radially onto the piston rod with only a small residual force. Since the piston rod is also generally subject to a certain lateral movement in addition to the translational oscillating movement, frictional forces on the axial contact surface of the packing ring can prevent or at least delay the radial movement of the ring, so that the ring can lift off the piston rod and accompanying leaks can occur.

CH 439 897 A discloses a three-part tangentially cut packing ring. Three bores are provided as throttle points, which are arranged centrally between the end faces, on a ring segment. A separate cover ring is required for the axial seal. U.S. Pat. No. 3,305,241 discloses a three-part tangentially cut packing ring, wherein two radial bores are provided centrally between the two end faces on each ring segment. The bores open into a circumferential groove on the inner circumferential surface. A separate cover ring for the axial seal is also required here. U.S. Pat. No. 1,828,178 does not disclose a packing ring for sealing, but rather a three-part tangentially cut oil control ring. A circumferential groove, which is connected to the axial end surface via openings, is arranged on the inner circumferential surface. Oil scraped from the piston rod is discharged to the outside through the openings. KR 101898141 B1 discloses a four-part packing ring having axial and tangential sealing. A central relief bore is arranged for each ring segment.

It is therefore an object of the invention to specify a packing ring and a sealing device which eliminate the disadvantages of the prior art. In particular, the packing ring is to be constructed as simply and compactly as possible, enable a longer service life, and be able to be flexibly adapted to different conditions of use.

SUMMARY OF THE INVENTION

According to the invention, the object is achieved in that at least three relief openings are provided on at least one ring segment, preferably on each ring segment, which relief openings extend from a radially inside inner circumferential surface of the ring segment to a radially outside outer circumferential surface and/or extend to the second axial ring end of the ring segment, wherein the relief openings each have a first relief opening end opening into the radially inside inner circumferential surface of the ring segment, wherein the first relief opening ends of two relief openings arranged adjacent to one another in the circumferential direction are spaced apart from one another in a relief opening circumferential distance, wherein the first relief opening ends are closer in the axial direction to the first axial ring end than to the second axial ring end and are arranged spaced apart from the first axial ring end at a relief opening axial distance which is 4% to 20% of the axial ring width of the ring segment. This creates a packing ring which, in the installed state during operation of a compressor, enables a pressure compensation between a high pressure applied to the outer circumferential surface and the second axial ring end and a lower pressure relative thereto applied to the first axial ring end.

The relief opening circumferential distance is preferably 1 mm to 15 mm, particularly preferably 2 mm, and the relief opening circumferential distance is preferably equal between all relief openings of a ring segment. The pressure compensation can thus be improved, in particular can take place more uniformly in the circumferential direction.

The at least one relief opening preferably has, at least at the relief opening end, a relief opening length in the circumferential direction which is 2-100% of the axial ring width of the packing ring, preferably 2-50%, in particular at most 25% of the axial ring width. In this way, for example, a groove-shaped recess extending over a relatively small area in the circumferential direction can be provided on the inner circumferential surface. Preferably, at least a portion of at least one relief opening adjoining the radially inside inner circumferential surface of the packing ring is inclined or curved in the direction of the first axial ring end. The pressure compensation can thus be adapted to the radial wear of the packing ring, in particular increased.

Advantageously, at least one relief opening is provided, the first relief opening end of which, which opens into the radially inner circumferential surface of the packing ring, is spaced apart in the circumferential direction from a second relief opening end of the relief opening, which opens into the radially outside outer circumferential surface of the packing ring. Thus, a relief bore, which extends obliquely from the inside inner circumferential surface up to the outside outer circumferential surface of the packing ring, can be provided, for example on the inside inner circumferential surface in the region of the first segment end.

It is advantageous if at least one axial groove, which extends from the first axial ring end to the second axial ring end, is provided on the radially outside outer circumferential surface of at least one ring segment, preferably each ring segment. The structural rigidity of the ring segment and therefore of the packing ring can thus be improved.

Preferably, the at least three relief openings each have, at least on the relief opening ends thereof, an axial relief opening width which is 2-30%, preferably 2-20% of the axial ring width of the packing ring. Advantageously, at least one relief opening has a straight course and a constant circular cross section with a relief opening diameter which is between 2-30%, preferably 2-20% of the axial ring width of the packing ring. As a result, the relief openings can be easily produced, for example by drilling or milling, wherein the dimensions have proven to be advantageous in order to achieve the best possible pressure compensation.

According to a further advantageous embodiment, at least one wear opening is provided on at least one ring segment, which opening extends from the radially outside outer circumferential surface and/or the second axial ring end of the ring segment in the direction of the radially inside inner circumferential surface of the ring segment, wherein a radially inner wear opening end of the at least one wear opening facing toward the inner circumferential surface is spaced apart at a distance in the radial direction of the ring segment from the radially inside inner circumferential surface of the ring segment which is at most 40% of a radial ring height extending between the outside outer circumferential surface and the radially inside inner circumferential surface of the ring segment, wherein the wear opening end lies between the first and the second axial ring ends and is spaced apart from the first and second axial ring ends. As a result, from a certain state of wear, in which the wear opening is exposed on the radially inside inner circumferential surface of the packing ring, the pressure compensation can be increased further and the contact pressure can be reduced.

It is advantageous if at least an end section facing toward the radially inside inner circumferential surface of at least one wear opening is inclined in the direction of the first axial ring end. As a result, similarly as with the inclined relief ring opening, the pressure compensation behavior from the exposure of the wear opening on the radially inside inner circumferential surface of the packing ring can be adapted to the progressing radial wear of the packing ring, in particular increased.

Advantageously, at least one wear opening has a straight course and a circular cross section with a wear opening diameter which is 2-60%, preferably 2-40%, of the axial ring width of the packing ring. As a result, the wear openings can be easily produced, for example by drilling or milling, wherein the dimensions have proven to be advantageous in order to achieve the best possible pressure compensation.

Preferably, a boundary of at least one wear opening facing toward the first axial ring end is spaced apart from the first axial ring end in the axial direction by a wear opening axial distance, which is 2% to 20%, preferably 2-15% of the axial ring width. Thus, the pressure compensation can be improved without impermissibly reducing the stability of the packing ring.

According to a further advantageous embodiment, at least one compensation recess is provided on at least one ring segment, which recess extends from the radially outside outer circumferential surface of the ring segment in the direction of the radially inside inner circumferential surface of the ring segment and from the first axial ring end in the direction of the second axial ring end, wherein preferably at least one compensation recess is provided per ring segment. As a result, the axial contact pressure on a wall and thus the friction in the radial direction can be reduced, so that the packing ring can better follow lateral movements of a piston rod.

It is also advantageous if at least one startup recess is provided on the radially inner circumferential surface of at least one ring segment, which recess extends in the axial direction of the ring segment from the second axial ring end in the direction of the first axial ring end and in the radial direction of the ring segment from the radially inside inner circumferential surface of the ring segment in the direction of the radially outside outer circumferential surface of the ring segment, wherein the startup recess has a radial startup recess depth of at most 3% of the ring height. As a result, increased surface pressure can be generated on the radially inside inner circumferential surface of the packing ring, which is not encompassed by the startup recess, during the startup phase of a compressor, which is particularly advantageous in the case of highly pressure-equalized packing rings in order to reduce leakage during startup.

The object is also achieved by a sealing device, wherein at least one packing ring according to the invention is provided in the sealing device, and by a piston compressor, wherein at least one packing ring according to the invention is provided in the compressor housing.

BRIEF DESCRIPTION OF THE DRAWINGS

The present invention is explained in more detail below with reference to FIGS. 1 to 8d, which show exemplary, schematic, and nonrestrictive advantageous embodiments of the invention. In the figures FIGS. 8a-8d show a ring segment of the packing ring with a startup section in different views.

DETAILED DESCRIPTION

Figure 1:
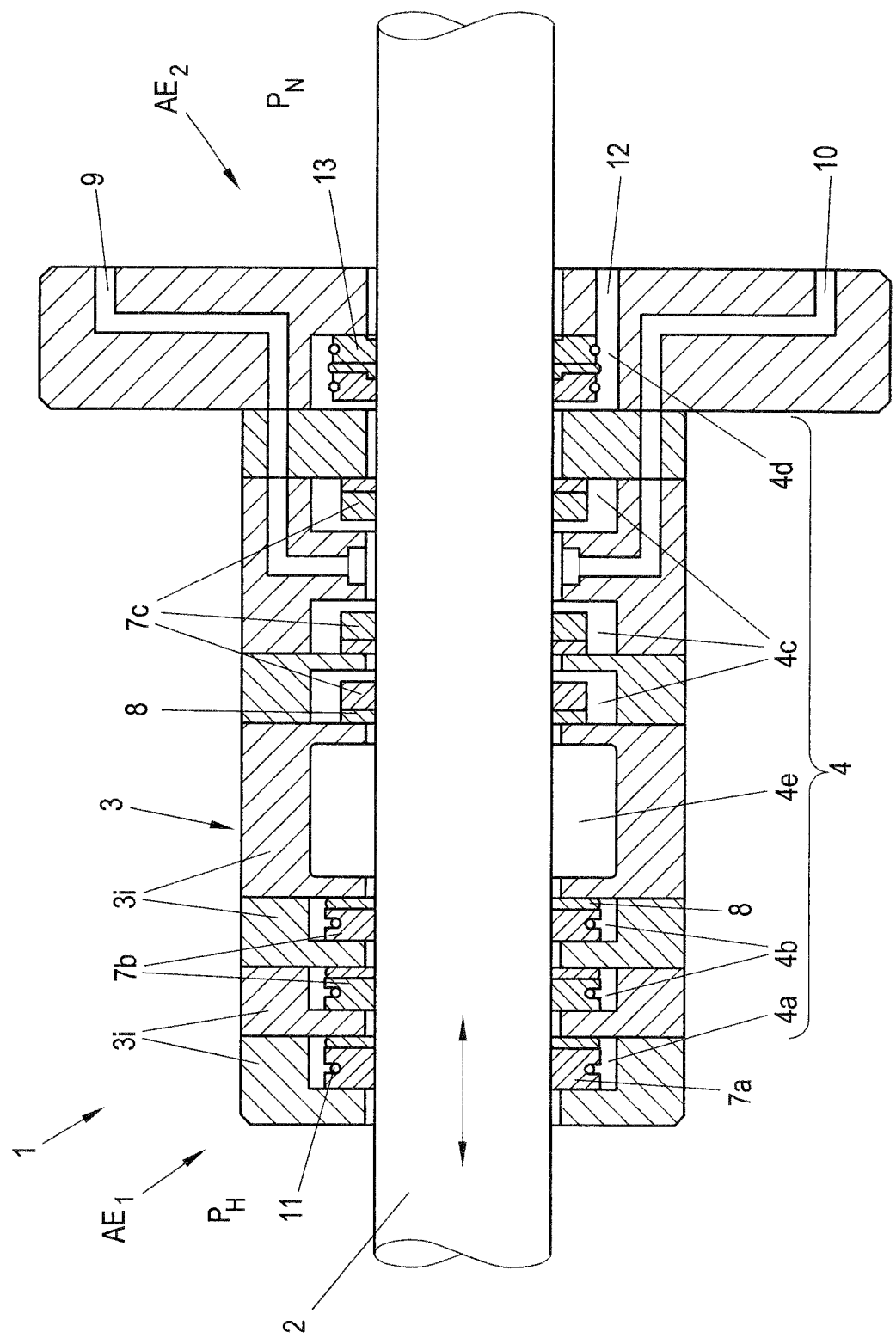
FIG. 1 shows a sealing device for a piston rod.

FIG. 1 shows a sealing device 1 (pressure packing) known in the prior art for a translationally oscillating piston rod 2, for example a well-known piston compressor (not shown) having cross-head. The piston rod 2 essentially performs a translational oscillating movement, as symbolized by the double arrow. The translational movement results from the known cross-head design of piston engines, which is used in particular in large, relatively slow-running piston engines, for example in gas compressors or large diesel engines. Lateral forces of the push rod are supported on a so-called cross-head joint, which is mounted in the crankcase. The piston, which is fastened on the cross head with a piston rod, thus only performs an essentially translational movement. The concept of the cross-head is basically known, which is why it is not discussed in more detail here. Solely translational movement is to be understood here, however, to mean that the piston rod 2 can also be subjected to slight lateral movements.

In the assembled state, the sealing device 1 is arranged in the piston compressor in such a way that a first axial sealing end AE1 faces in the axial direction toward the piston of the piston compressor (not shown) arranged in a cylinder. An opposite, second axial sealing end AE2 of the sealing device 1 faces toward the crankcase of the piston compressor. The sealing device 1 thus serves to seal a high pressure $P_H$ at the first sealing end AE1 (in the cylinder) in relation to a pressure $P_N$ lower relative thereto at the second sealing end AE2 (in the crankcase), which essentially corresponds to the ambient pressure or can be slightly higher. Achieving the best possible sealing effect is important in order to ensure that as little compressed medium as possible can escape from the cylinder into the crankcase and from there, under certain circumstances, into the environment. This is particularly important in the case of gas compressors, in which, for example, natural gas is compressed, in order to prevent a combustible mixture of gas and air from being formed outside the compressor, which could, under certain circumstances, result in a flame or an explosion. In addition, the best possible seal is required for safety reasons so as not to endanger people in the surroundings of the compressor. In addition, the best possible seal is advantageous in order to increase the delivery rate and therefore the efficiency of the compressor.

The sealing device 1 generally has a substantially cylindrical housing 3 that can be assembled, for example, from a number i of housing segments 3i (also called chamber disks) arranged axially in succession. In the example shown, the sealing device 1 has a plurality of chambers 4 facing toward the connecting rod 2, which chambers are formed here by recesses in the housing segments 3i. One or more packing rings 7a-7c in various embodiments are arranged in each of the chambers 4, for example the combination of a radially cut packing ring and a tangentially cut packing ring mentioned at the outset or, as shown, a combined radially/tangentially cut packing ring 7b. Axially adjoining the packing rings 7a-c, a support ring 8, which is made of a suitable metal, for example, can be provided in each case to avoid extrusion of the packing rings 7a-c. The sealing device 1 shown has, for example, three different types of packing rings 7, wherein the first packing ring 7a adjoining the cylinder is provided as a so-called "pressure breaker", which is used to reduce the flow velocity of the gas. Two packing rings 7b, each in a chamber 4b, are arranged adjacent to the packing ring 7a in the direction of the crankcase. The packing rings 7b are conventional combined radially/tangentially cut packing rings, here. The packing rings 7c axially adjoining thereon are each arranged in a chamber 4c and, in the example shown, are separated from the chambers 4b or the packing rings 7b arranged therein by a buffer chamber 4e. In the exemplary embodiment shown, the packing rings 7c form a sealing barrier, as described, for example, in EP 2 376 819 B1 or EP 2 855 982 B1. For this purpose, a pressurized sealing medium, for example sealing oil, is fed into the chambers 4c via a feed line 9. The sealing medium can be discharged for circulation via a discharge line 10. Due to the sealing medium, the packing rings 7c are subjected to an oil pressure from radially outside and axially and are pressed by this (pressure) against the piston rod 2 and axially apart in order to create or improve the seal. The packing rings 7b, on the other hand, are held on the piston rod 2 by means of tube springs 11 arranged on the circumference and, during operation, are pressed against the piston rod 2 by a pressure difference. The sealing by a sealing barrier by means of packing rings 7c is, however, only shown for the sake of completeness and does not play a role for the invention.

At the second axial sealing end AE2 of the sealing device 1, two scraper rings 13 are arranged adjoining to the packing rings 7c, which are provided to scrape off and collect sealing medium adhering to the piston rod 2. The scraper rings 13 scrape off the sealing medium and discharge it radially outward into a chamber 4d. The sealing medium is removed from the chamber 4d by means of a collecting line 12, then filtered, for example, collected in a storage container, and fed back to the packing rings 7b.

The sealing device 1 in FIG. 1 is of course only an example and can be designed in any other way, in particular with other arrangements of packing rings 7a-c and/or scraper rings 13. For example, the housing segments 3i for forming the chambers 4c for sealing by means of a sealing barrier and the buffer chamber 4e could also be completely dispensed with and, in the sealing device 1, only housing segments 3i having chambers 4b for packing rings 7b and one or more chamber(s) 4d for scraper ring(s) 13 could be provided. According to the invention, at least one packing ring 14, which is described below and designed according to the invention, is arranged in the sealing device 1.

The packing ring 14 according to the invention explained below with reference to FIGS. 2-8d relates, for example, to one of the packing rings 7b shown in FIG. 1. Of course, the sealing device 1 shown is only to be understood as an example in order to explain the application of the packing ring 14 according to the invention. The sealing device 1 could of course also have more or less dry-running packing rings 7a (pressure breaker rings), packing rings 7b, packing rings 7c subjected to sealing medium, and scraper rings 13, e.g., just one or more dry-running packing rings 7b, wherein at least one packing ring 14 according to the invention is provided.

Figure 2:
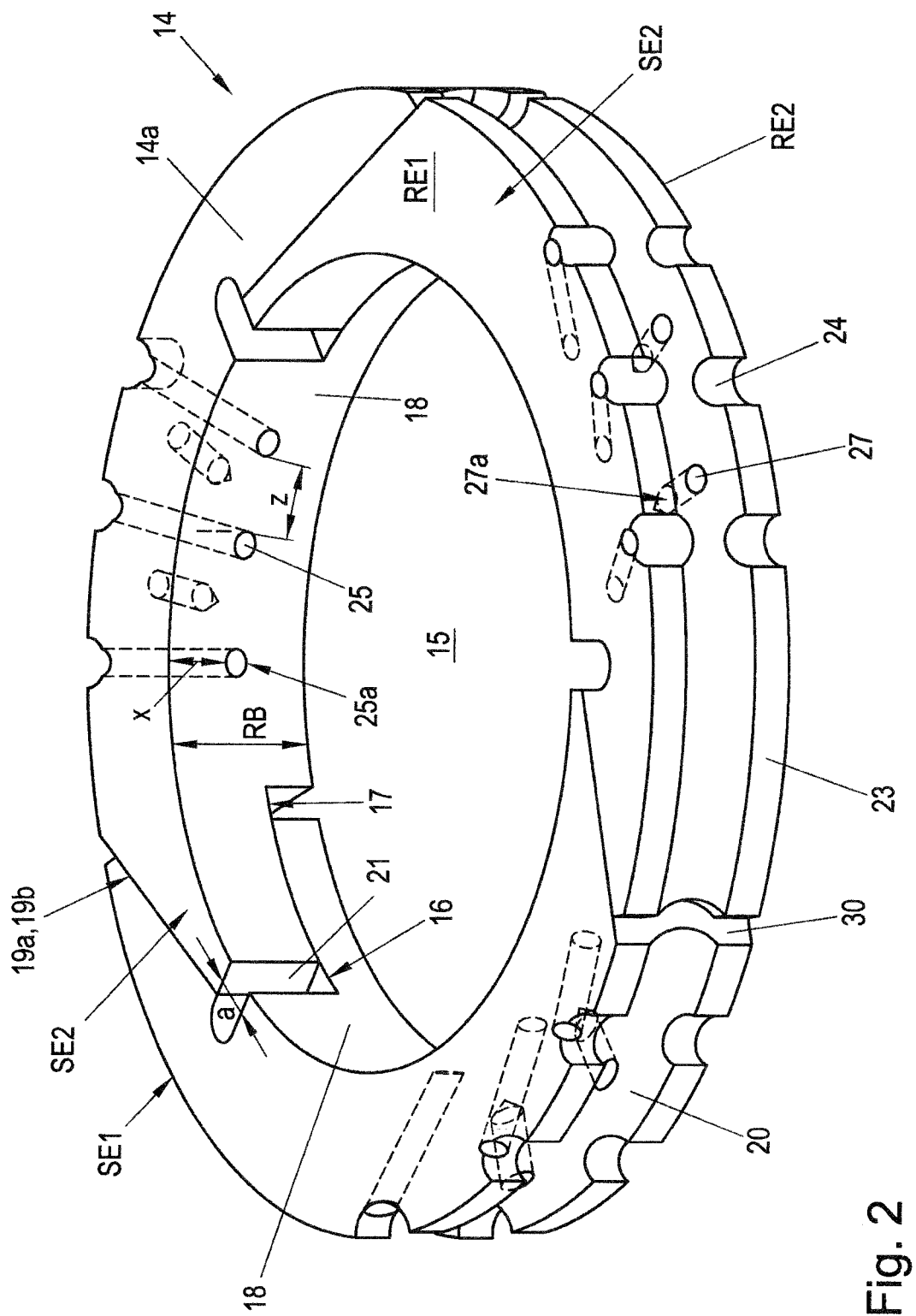
FIG. 2 shows a packing ring in an isometric view.

FIG. 2 shows a packing ring 14 according to the invention. The packing ring 14 has a central, substantially cylindrical opening 15 through which, in the installed state, the translationally oscillating piston rod 2 (see FIG. 1), for example of a piston compressor, extends. The diameter of the cylindrical opening 15, that is to say the inner diameter Di (see FIG. 3a) of the packing ring 14 essentially corresponds to the diameter of the piston rod 2 or, during operation, adapts to it even when it is worn, as will be explained in more detail below. The packing ring 14 has at least three ring segments 14a, each with a first segment end SE1 in the circumferential direction and a second segment end SE2 in the circumferential direction. The three ring segments 14a are preferably of identical design and can be assembled adjacent to one another in the circumferential direction in order to form the packing ring 14. The subdivision of the packing ring 14 into ring segments 14a has the advantage that the packing ring 14 can be installed more easily on the piston rod 2 and that wear of the packing ring 14 that occurs during operation of the compressor can be better compensated for. In particular, the piston rod 2 does not have to be removed in order to arrange the packing ring 14 around the piston rod 2.

A first tangential contact surface 19a and a first axial contact surface 16 are provided at the first segment end SE1 of a ring segment 14a (see also FIG. 3b), wherein the first axial contact surface 16 faces toward the first axial ring end RE1. Both the first tangential contact surface 19a and the first axial contact surface 16 are preferably delimited by a first wear limiting surface 22. In the example shown, the first tangential contact surface 19a and the first axial contact surface 16 directly adjoin one another and are preferably arranged at a right angle to one another. In the simplest case, a first axial segment recess can be provided at the first segment end SE1 (see also FIG. 3b), which extends from a first axial ring end RE1 of the packing ring 14 partially in the direction of an axially opposite second axial ring end RE2. The boundary surfaces of the first axial segment recess thus form the first tangential contact surface 19a and the first axial contact surface 16 and also the first wear limiting surface 22, the function of which will be explained in detail below.

At the second segment end SE2 of a ring segment 14a, a second tangential contact surface 19b is provided, which abuts the first tangential contact surface 19a of the first segment end SE1 of a ring segment 14a adjoining it in the circumferential direction in order to create a radial seal for the packing ring 14. In addition, a second axial contact surface 17 is provided at the second segment end SE2 of a ring segment 14a (see also FIGS. 4a+4b), which abuts the first axial contact surface 16 of the first segment end SE1 of a ring segment 14a adjoining it in the circumferential direction in order to create an axial seal for the packing ring 14. The second tangential contact surface 19b and the second axial contact surface 17 preferably adjoin one another and are advantageously arranged at a right angle to one another. In the simplest case, as shown, a second axial segment recess can be provided at the second segment end SE2 of the ring segments 14a (see also FIG. 4b), which extends partially axially from the second axial ring end RE2 of the packing ring 14 in the direction of the opposite, first axial ring end RE1. The axial delimitation of the second axial segment recess forms the second axial contact surface 17 and the delimitation in the circumferential direction forms a second end surface 29. However, the second axial segment recess does not form the second tangential contact surface 19b; this is formed, for example, in that the ring segment 14a is cut off tangentially radially on the outside at the second segment end SE2. At this point, however, it should be noted that the term tangential in connection with the first and second tangential contact surfaces 19a, 19b does not necessarily mean tangential in the strictly mathematical sense. This means that the course of the tangential contact surfaces 19a, 19b does not necessarily have to form a tangent of a curvature, for example of the inner diameter Di or the outer diameter Da. The first and second segment recesses can thus be produced, for example, by means of a suitable milling cutter or recessed in the course of an injection molding process.

The packing ring 14 is arranged in the installed state in the compressor so that the first axial ring end RE1 faces toward the crankcase, in which the low pressure $P_N$ prevails, which essentially corresponds to the ambient pressure (or can be slightly higher) and that the second axial ring end RE2 faces toward the cylinder, in which the relatively higher pressure $P_H$ prevails. The terms high-pressure side and low-pressure side are also used for this in the following. It should be noted that when multiple packing rings 14 are arranged axially in succession in a sealing device 1, the pressure over the entire sealing device 1 is reduced from the high pressure $P_H$ on the cylinder side to the low pressure $P_N$ relative thereto on the crankcase side. This means that the packing ring 14, which is the first to adjoin the cylinder in the axial direction, is subjected to higher pressures than the following packing rings 14 in the direction of the crankcase. The pressure conditions at the packing rings 14 of a sealing device 1 therefore differ as a rule.

In the installed new state, when the packing ring 14 is not yet worn, in the example shown the first and second wear limiting surfaces 21, 22 of adjoining ring segments 14*a* facing toward one another in the circumferential direction are spaced apart from one another by a wear distance a, wherein the tangential contact surfaces 19*a*, 19*b* and the axial contact surfaces 16, 17 of course nevertheless abut one another in order to create the radial and axial sealing of the packing ring 14. This wear distance a is used to compensate for the wear which the packing ring 14 is subject to on the radially inside inner circumferential surface 18 during running operation. A circumferential groove 20, which extends in the circumferential direction around the entire packing ring 14, can be provided on the radially outside outer circumferential surface 23 of the packing ring 14. The circumferential groove 20 is provided to receive a tube spring 11 (not shown) which radially tensions the packing ring 14 and holds it on the piston rod 2 in the installed state, as has been explained with reference to FIG. 1.

Figure 3A:
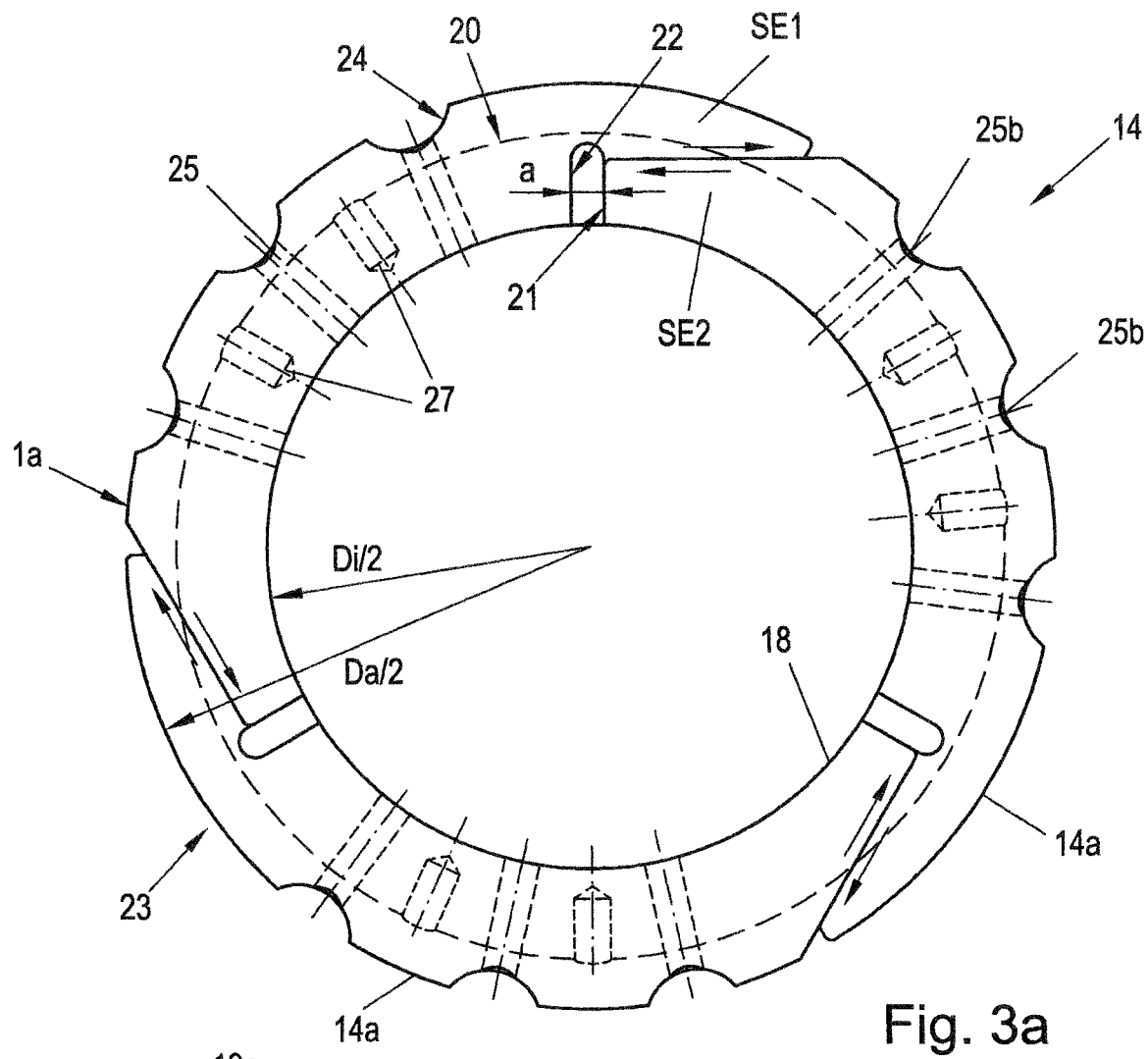
FIGS. 3a and 3b show a packing ring or a ring segment in a top view of the first axial ring end.

If wear occurs on the inner circumferential surface 18, the tube spring 11 in combination with the high pressure $P_H$ on the cylinder side ensures that the packing ring 14 automatically adjusts itself radially in that the tangential contact surfaces 19*a*, 19*b* facing toward one another of the ring segments 14*a* slide against one another, as indicated in FIG. 3*a* by the arrows at the segment ends SE1, SE2. The wear reduces the wear distance a until a maximum possible wear adjustment is reached, at which the wear distance goes to zero (a=0) and a second wear limiting surface 21 provided in the circumferential direction at the end of the second segment end SE2 of a ring segment 14*a* abuts the first wear limiting surface 22 of the first segment end SE1 of an adjoining ring segment 14*a* in the circumferential direction.

According to the invention, at least three relief openings 25 are provided on at least one ring segment 14*a*, but preferably on all ring segments 14*a*, which each extend from the radially inside inner circumferential surface 18 of the respective ring segment 14*a* of the packing ring 14 to the radially outside outer circumferential surface 23 and/or each extend to the second axial ring end RE2 of the respective ring segment 14*a* of the packing ring 14. The relief openings 25 are therefore continuous recesses that connect the inside inner circumferential surface 18 to the radially outside outer circumferential surface 23 and/or to the second axial ring end RE2. The relief openings 25 therefore do not open into a peripheral circumferential groove on the inside inner circumferential surface 18, as was previously the case in the prior art, but rather directly into the inside inner circumferential surface 18.

The relief openings 25 are used to deliberately influence the pressure conditions that prevail during operation of the compressor on the packing ring 14 between the high-pressure side of the packing ring 14 facing toward the cylinder (second axial ring end RE2) and the low-pressure side of the packing ring 14 facing toward the crankcase (first axial ring end RE1), as will be explained in more detail below with reference to FIGS. 5*a*+5*b*.

The relief openings 25 each have a first relief opening end 25*a* which opens into the radially inside inner circumferential surface 18 of the respective ring segment 14*a* of the packing ring 14. The relief opening ends 25*a* of two adjacent relief openings 25 opening into the radially inside inner circumferential surface 18 are arranged spaced apart from one another in the circumferential direction at a relief opening circumferential distance z. This means that the relief opening ends 25*a* are not connected to one another on the radially inside inner circumferential surface 18. The inner circumferential surface 18 of the ring segment 14*a* thus extends in the circumferential direction between two adjacent relief opening ends 25*a*. Depending on the size of the ring segment 14*a*, the relief opening circumferential distance z is preferably 1 mm to 15 mm, particularly preferably 1-10 mm, for example 2, 3, 4, 5, 6, 7, 8, 9, 10, 11, 12, 13, 14 mm. Distances in between are also possible, for example 1.5 mm, 2.5 mm, 3.5 mm, 4.5 mm, 5.5 mm, etc. The relief opening circumferential distance z is not measured from the center of the relief opening end 25*a* to the center of the relief opening end 25*a*, but rather indicates the distance in the circumferential direction between the boundaries of the relief opening end 25*a*, or in other words the length of the inner circumferential surface 18 in the circumferential direction between the adjacent relief opening ends 25*a*. The relief opening circumferential distances z between the relief opening ends 25*a* of the relief openings 25 of a ring segment 14*a* do not necessarily have to be the same, however.

The relief opening ends 25*a* are spaced apart at a relief opening axial distance x from the first axial ring end RE1. The inner circumferential surface 18 of the ring segment 14*a* thus extends in the axial direction between a relief opening end 25*a* and the first axial ring end RE1. The relief opening axial distance x is 4% to 20% of the axial ring width RB, particularly preferably 4-15%, in particular at most 10%, as shown in FIG. 2 and in detail in FIG. 6. The relief opening axial distance x is also not measured from the center of a relief opening end 25*a*, but again from the boundary of the relief opening end 25*a*, or in other words as the length of the inner circumferential surface 18 in the axial direction between the relief opening end 25*a* and the first axial ring end RE1. The relief opening radial distances x of the relief opening ends 25*a* of the relief openings 25 of a ring segment 14*a* do not necessarily have to be the same, however. The axial ring width RB extends between the first and second axial ring ends RE1, RE2. Details on the design of a relief opening 25 are explained in detail below with reference to FIG. 6. As can be seen in FIG. 2, the axial relief opening width of the relief openings 25, at least at the relief opening ends 25*a*, is small in relation to the ring width RB. With a circular cross section of the relief openings 25 (at least at the relief opening ends 25*a*), the axial relief opening width corresponds to the diameter. The axial relief opening width of the relief opening ends 25*a* is preferably 2%-30% of the ring width RB, preferably 2-25%, particularly preferably at most 20%, in particular at most 15%. In general, the relief opening ends 25*a* are not located centrally between the two axial ring ends RE1, RE2 of the packing ring 14, but closer to the first axial ring end RE1 than to the second axial ring end RE2. The first axial ring end RE1 faces toward the low-pressure side in the installed state.

The further features shown in the figures, in particular FIGS. 2 to 4*b*, in particular the course of a relief opening 25, the provision of one or more wear opening(s) 27, the circumferential groove 20, or the axial grooves 24, are optional and are described below. The embodiment of the packing ring 14 according to FIG. 2 thus shows an advantageous embodiment having multiple mutually independent features.

In order to improve the structural rigidity of the packing ring 14, at least one ring segment 14*a*, preferably each ring segment 14*a*, can be provided with at least one axial groove 24 on the outer circumferential surface 23, which groove extends continuously in the axial direction from the first axial ring end RE1 (possibly interrupted by the circumferential groove 20) to the second axial ring end. However, multiple axial grooves 24 are preferably provided for each ring segment 14a. In the example shown, the relief openings 25 on the outer circumferential surface 23 each open into an axial groove 24. Of course, this is not absolutely necessary and the relief openings 25 could also open in the circumferential direction next to the axial grooves 24 into the outer circumferential surface 23 of the packing ring 14 (or into the circumferential groove 20).

The relief openings 25 in the embodiment shown are each designed in the form of cylindrical bores, since these can be produced particularly easily by machining. Of course, a non-circular cross section could also be provided for one or more relief openings 25 and/or a non-straight course of the relief openings 25, which, however, increases the cost of producing the relief openings 25.

The relief openings 25, however, preferably have a straight course, so that they can be produced as simply as possible, for example by means of a cylindrical drill or milling cutter. Of course, other production methods would also be conceivable, for example the relief openings 25 could be produced directly by means of an injection molding method, in particular integrated into the ring segment 14a during the injection molding method, without the need for subsequent drilling, for example. It would also be conceivable that the packing ring 14 is produced by means of an additive manufacturing process, for example, 3-D printing, wherein the relief openings 25 are again able to be taken into consideration directly during the production.

How the relief openings 25 are produced does not play a role for the invention, however, it is essential that the required boundary conditions of the relief openings 25 are complied with, thus the relief opening circumferential distance z in the circumferential direction, the relief opening axial distance x, and the requirement that the relief openings 25 extend from the radially inside inner circumferential surface 18 to the radially outside outer circumferential surface and/or to the second axial ring end RE2 (at each of which the cylinder-side high pressure $P_H$ is applied). In the simplest embodiment, the relief openings 25 extend in the radial direction of the packing ring 14, as shown in section A-A of FIG. 6, thus parallel to the axial ring ends RE1, RE2.

According to one preferred embodiment, however, at least a portion of the at least one relief opening 25 adjacent to the radially inner circumferential surface 18 of the packing ring 14 is inclined in the direction of the first axial ring end RE1, for example, by a first relief opening angle ε, as also indicated in the example shown in FIG. 2 and explained in more detail below with reference to FIG. 6. Thus, the pressure conditions on the packing ring 14 can be deliberately influenced during the service life of the packing ring 14, whereby the pressure compensation of the packing ring 14 can be adapted to the radial wear. In the simplest case, the corresponding relief opening 25 is also embodied as a cylindrical bore in this embodiment, wherein the bore axis is inclined towards the first axial ring end RE1. The second relief opening end 25b, which opens into the radially outside outer circumferential surface 23, is therefore closer to the first axial ring end RE1 than the first relief opening end 25a of the relief opening 25, which opens into the radially inside inner circumferential surface 18. Due to the inclined course, the first relief opening end 25a "travels" essentially in the direction of the first axial ring end RE1 as the ring segment 14a wears radially, whereby the pressure compensation of the packing ring 14 is increased depending on the wear, since the high pressure $P_H$ on the inner circumferential surface 18 is brought closer to the first axial ring end RE1 in the axial direction. This essentially means that the higher the wear on the ring segment 14a, the higher the pressure compensation as well. This reduces the radial contact pressure of the packing ring 14 against the piston rod 2 during operation and increases the service life of the packing ring 14.

In order to better distribute the pressure on the radially inside inner circumferential surface 18 in the circumferential direction, one or more relief openings 25 could, for example, also end in a type of milled recess/groove in the radially inside inner circumferential surface 18, which extends in the circumferential direction over a relatively small area. In this case, the first relief opening ends 25a would no longer have the preferably circular cross section of the remaining relief opening 25 (radially between milled recess/groove and outside outer circumferential surface 23 and/or second axial ring end RE2), but would be formed by the corresponding shape of the milled recess/groove. The relief opening circumferential distance z in the circumferential direction and the relief opening axial distance x in the axial direction would then be measured from the respective boundary of the milled recess/groove in the axial direction and in the circumferential direction. Instead of a milled recess/groove, a kind of elongated hole could also be provided, for example. The relief openings 25 generally have, at least at the relief opening ends 25a thereof, a relief opening length in the circumferential direction, which is preferably 2-100% of the axial ring width RB of the packing ring 14, preferably 2-50%, in particular at most 25% of the axial ring width RB. In general, it is essential that the relief opening ends 25a on the radially inside inner circumferential surface 18 are not connected to one another by a circumferential groove provided for pressure compensation during operation. This is because a circumferential groove would, in particular in conjunction with a small axial relief opening spacing x, result in a narrow flank made of ring material being formed at the first axial ring end RE1. This flank would be excited to vibrate during operation, which would result in uneven wear and undesired leaks.

Figure 4A:
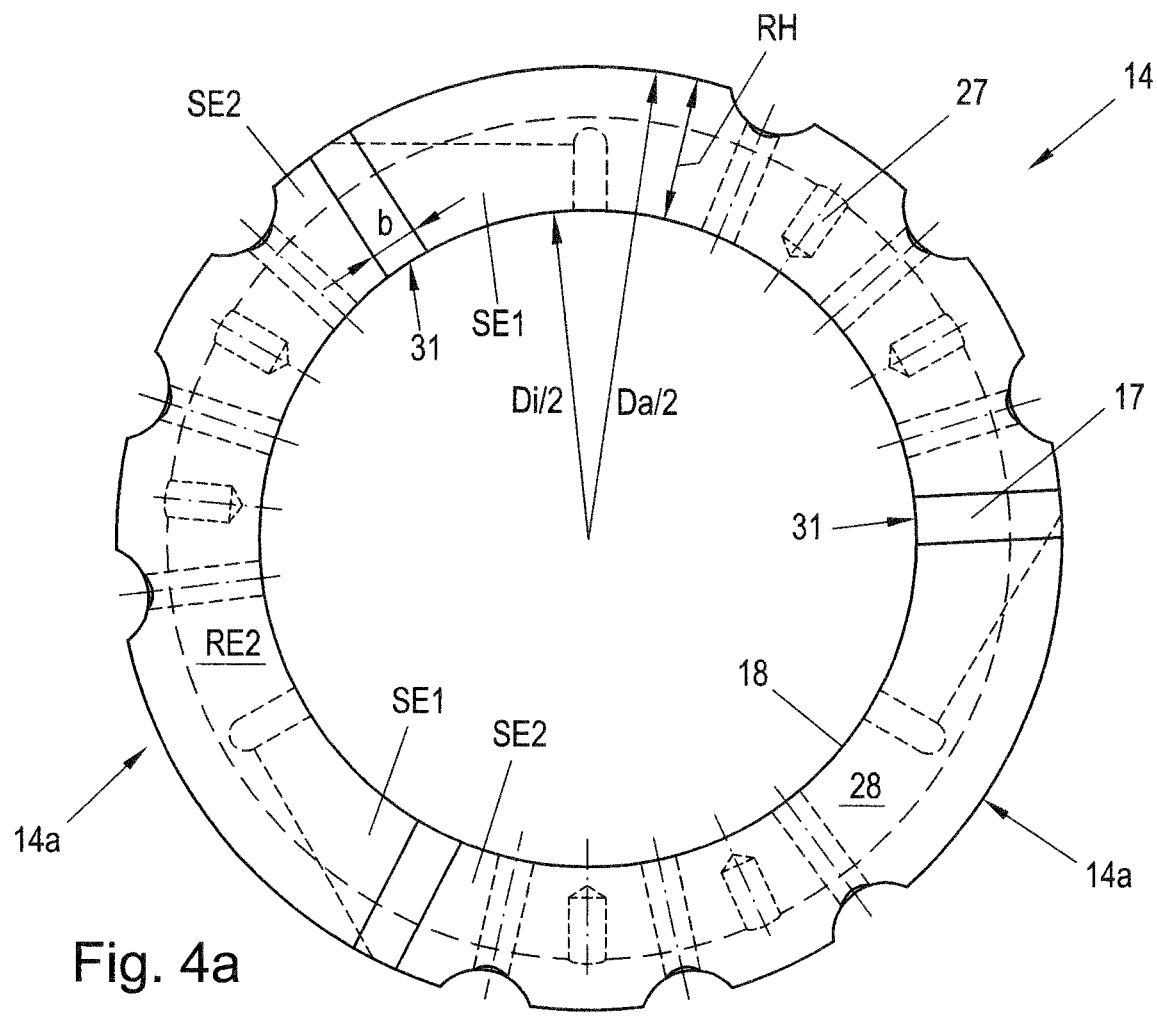
FIGS. 4a and 4b show a packing ring or a ring segment in a top view of the second axial ring end.

According to a further advantageous embodiment of the invention, at least one wear opening 27 is additionally provided on at least one ring segment 14a of the packing ring 14, preferably on each ring segment 14a, which extends from the radially outside outer circumferential surface 23 and/or the second axial ring end RE2 of the packing ring 14 over part of the ring height RH in the direction of the radially inside inner circumferential surface 18 of the packing ring 14, but does not extend to the inner circumferential surface 18 of the ring segment 14a in the unworn state of the ring segment 14a. In the case of a bore, the wear opening 27 would be embodied, for example, as a blind bore starting from the outer circumferential surface 23 in the direction of the inner circumferential surface 18. Of course, the wear opening 27 embodied as a bore could also additionally or alternatively be drilled starting from the second axial ring end RE2 in the direction of the inner circumferential surface 18. It is essential for the wear opening 27 (regardless of its embodiment) that a wear opening end 27a (see FIG. 6) of the at least one wear opening 27 facing most toward the inner circumferential surface 18 in the radial direction is spaced apart at a distance in the radial direction of the ring segment 14a from the radially inside inner circumferential surface 18 of the ring segment 14a, which is at most 40% of the ring height RH, preferably at most 30%, particularly preferably at most 20%. The ring height RH extends between the outside outer circumferential surface 23 and the radially inside inner circumferential surface 18 of the packing ring 14, thus essentially corresponds to half the difference between the inner diameter Di and the outer diameter Da of the packing ring 14, as shown in FIG. 4*a*. It is essential that the wear opening end 27*a* lies between the first and second axial ring ends RE1, RE2 and is spaced apart from the first and second axial ring ends RE1, RE2. This means that the wear opening end 27*a* is surrounded by ring material seen both in the axial direction and in the circumferential direction, so that it is only exposed when there is a corresponding radial wear.

However, as shown in FIGS. 2-4, multiple wear openings 27 are preferably provided on a ring segment 14*a* over the circumference, particularly preferably at least two wear openings 27 per ring segment 14*a*. In the example shown, the wear openings 27 extend from the outer circumferential surface 23 or here from the outer circumferential groove 20 arranged on the outer circumferential surface 23 in the radial direction of the packing ring 14 (parallel to the axial ring ends RE1, RE2) in the direction of the inner circumferential surface 18, without reaching the inner circumferential surface 18, and are embodied as cylindrical bores.

If the wear openings 27 are drilled, they can, as shown, have a conical base, in accordance with the drill used. If the wear openings 27 are milled, for example by means of a milling cutter, they generally have an essentially flat base. Of course, other manufacturing options would again also be conceivable, such as injection molding or additive manufacturing.

The length and the diameter of the wear openings 27 essentially depend on a desired pressure compensation behavior of the packing ring 14, wherein the length or the extension in the radial direction is dimensioned so that the wear opening end 27*a* of the wear opening 27 is spaced apart at most 40% of the radial ring height RH of the packing ring 14 from the inner circumferential surface 18. In the example shown in FIGS. 2-4, the wear openings 27 are arranged centrally in the axial direction between the two ring ends RE1, RE2. However, they could also be arranged closer to one ring end RE1, RE2, preferably at a wear opening axial distance y from the first axial ring end RE1 which is 2% to 20% of the ring width RB, preferably 2-15%, in particular at most 10%, as will be explained in more detail with reference to FIG. 6. The specific axial arrangement substantially depends on the desired pressure compensation of the packing ring 14 to be achieved.

The at least one wear opening 27, or the preferably multiple wear openings 27, of a ring segment 14*a* are dimensioned such that, from a certain state of wear of the packing ring 14, a radially inner wear opening end 27*a* facing toward the inner circumferential surface 18 (see FIG. 2 and in particular FIG. 6) is exposed. As a result, from this state of wear, the wear openings 27 extend completely from the outer circumferential surface 23 to the inner circumferential surface 18. From this state of wear, the wear openings 27 therefore act like the (non-inclined) relief openings 25. In particular, during operation of the compressor, the wear openings 27 then increase the pressure compensation between the inner circumferential surface 18 and the outer circumferential surface 23 of the packing ring 14, whereby, for example, premature undesired collapse of the packing ring 14 can be avoided.

The wear opening(s) 27 can also extend, however, starting from the second axial ring end RE2 in the direction of the inner circumferential surface 18, analogously to the relief openings 25, since the high pressure $P_H$ is also applied to the second axial ring end RE2.

For example, the wear openings 27 can be dimensioned such that, from the state of wear in which the wear openings 27 are exposed on the inner circumferential surface 18, an essentially complete pressure compensation takes place between the inner circumferential surface 18 and the outer circumferential surface 23. As a result, the packing ring 14 would lose some of its sealing effect, but the risk of destruction can be reduced, in particular avoided. A complete pressure compensation is understood here to mean that the radial forces acting on the outer circumferential surface 23 and on the inner circumferential surface 18 due to pressure are essentially completely balanced, so that essentially no force caused by a pressure difference still acts on the packing ring 14 in the radial direction. This essentially means that a packing ring 14 deactivates itself from a certain state of wear. For this purpose, it is preferably provided that one or more other packing rings 14 of the sealing device 1, which can have less wear, still display their sealing effect essentially normally. The deactivated packing ring or rings 14 do not have to be exchanged immediately, which would result in a standstill of the compressor, but predetermined maintenance intervals could be adhered to more easily, for example from a certain leakage amount, which can be detected by measurement.

Similarly to the relief opening(s) 25, it can be advantageous if at least an end section of at least one wear opening 27 facing toward the radially inside inner circumferential surface 18 is inclined in the direction of the first axial ring end RE1, for example by a wear opening angle φ, as will be explained in more detail below with reference to FIG. 6. In this case, too, the pressure compensation behavior can thus be adapted over the wear. The wear openings 27 are preferably each arranged in the circumferential direction between two relief openings 25, particularly preferably centrally between two relief openings 25.

Figure 3B:
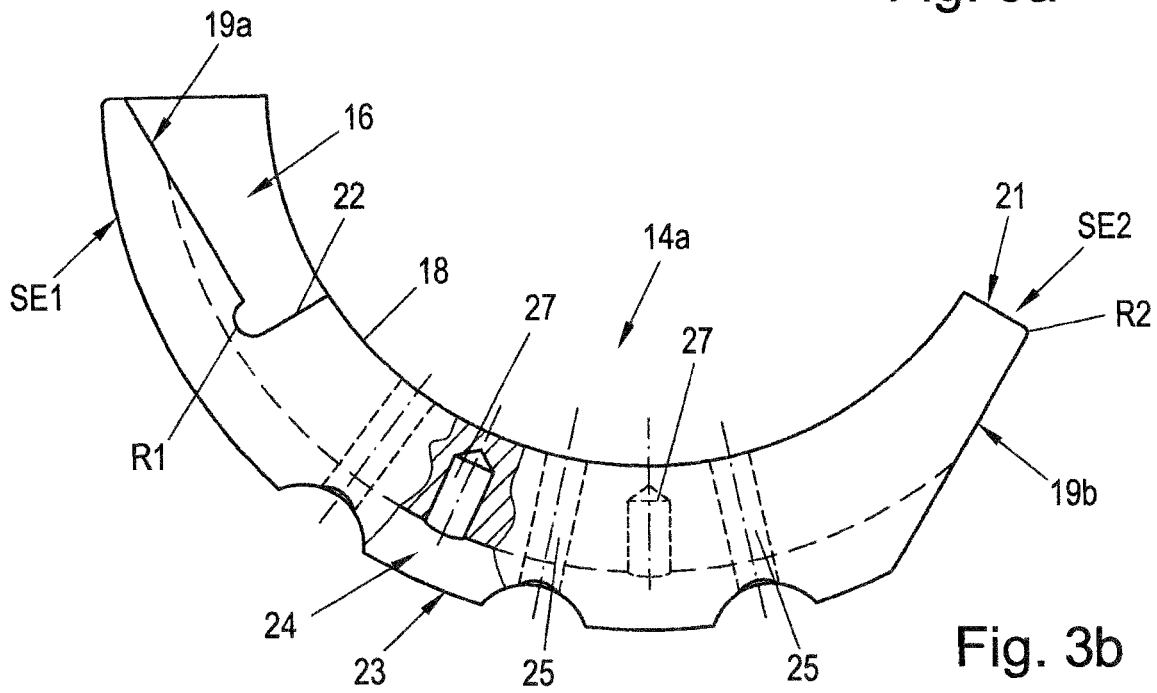

In FIG. 3*a*, the packing ring 14 shown in FIG. 2 is shown in a top view normal to the first axial ring end RE1 or the preferably flat first ring end surface, which faces toward the low-pressure side in the installed state. FIG. 3*b* shows a single ring segment 14*a* of the packing ring 14 according to FIG. 3*a*. The shape of the first axial segment recess can be seen in FIG. 3*b*, which is arranged at the first segment end SE1 of the ring segment 14*a* in order to form the first tangential contact surface 19*a* and the first axial contact surface 16. As already described, the first axial segment recess extends axially from the first axial ring end RE1 partially in the direction of the opposite, second axial ring end RE2, so that the second segment end SE2 of a ring segment 14*a* adjoining it in the circumferential direction can engage in the first axial segment recess. Adjacent ring segments 14*a* thus partially overlap in the circumferential direction, so that the first tangential contact surfaces 19*a* of the first segment ends SE1 of the ring segments 14*a* abut the second tangential contact surfaces 19*b* of the second segment ends SE1 of an adjacent ring segment 14*a* in order to create the radial sealing of the packing ring 14. Analogously, the first axial contact surfaces 16 of the first segment ends SE1 of the ring segments 14*a* formed by the respective first axial segment recess abut the second axial contact surfaces 17 of the second segment ends SE2 formed by the respective second axial segment recess in order to create the axial sealing of the packing ring 14. The first axial segment recess and the second axial segment recess are arranged on segment ends SE1, SE2 of a ring segment 14a that are opposite in the circumferential direction and on the opposite axial ring ends RE1, RE2.

The segment ends SE1, SE2 cooperate in the circumferential direction in such a way that the tangential contact surfaces 19a, 19b face toward one another and can slide against one another. This enables the packing ring 14 to be readjusted for wear during operation until the wear distance a (see FIGS. 2+3a) between the second wear limiting surface 21 of the second segment end SE2 of a ring segment 14a abuts the first wear limiting surface 22 of the first axial segment recess of the first segment end SE1 of the adjacent ring segment 14a. At the second segment end SE2 of the ring segment 14a, preferably at the transition between the second tangential contact surface 19b and the second wear limiting surface 21, an outer rounding R2 with a certain radius is provided in order to facilitate wear readjustment or, in particular, the sliding of the tangential contact surfaces 19a, 19b against one another. At the first segment end SE1, analogously thereto, an inner rounding R1 is advantageously provided between the first tangential contact surface 19a and the first wear limiting surface 22, as shown in FIGS. 3b and 4b.

The wear openings 27 are embodied here as blind bores having a conical base and extend from the outer circumferential surface 23, here the base of the circumferential groove 20, radially over part of the ring height RH in the direction of the inner circumferential surface 18, wherein the wear opening ends 27a of the wear openings 27 are each spaced apart at a distance in the radial direction of the ring segment 14a from the radially inner circumferential surface 18, which is at most 40% of the radial ring height RH of the packing ring 14. In the illustrated packing ring 14, three relief openings 25 and two wear openings 27 are provided for each ring segment 14a. The wear openings 27 are arranged here centrally between the relief openings 25 in the circumferential direction. The wear openings 27 extend here in the radial direction of the packing ring 14 (parallel to the axial ring ends RE1, RE2) and the relief openings 25 are inclined, that is, they are inclined in the direction of the first axial ring end RE1 in order to increase the pressure compensation depending on the wear. Of course, this design is only to be understood as an example, the precise structural design and the number and orientation of the relief openings 25 and/or of the wear openings 27 is of course left to the person skilled in the art and depends on the desired area of application of the packing ring 14 and the effect to be achieved, in particular a pressure compensation to be achieved.

Figure 4B:
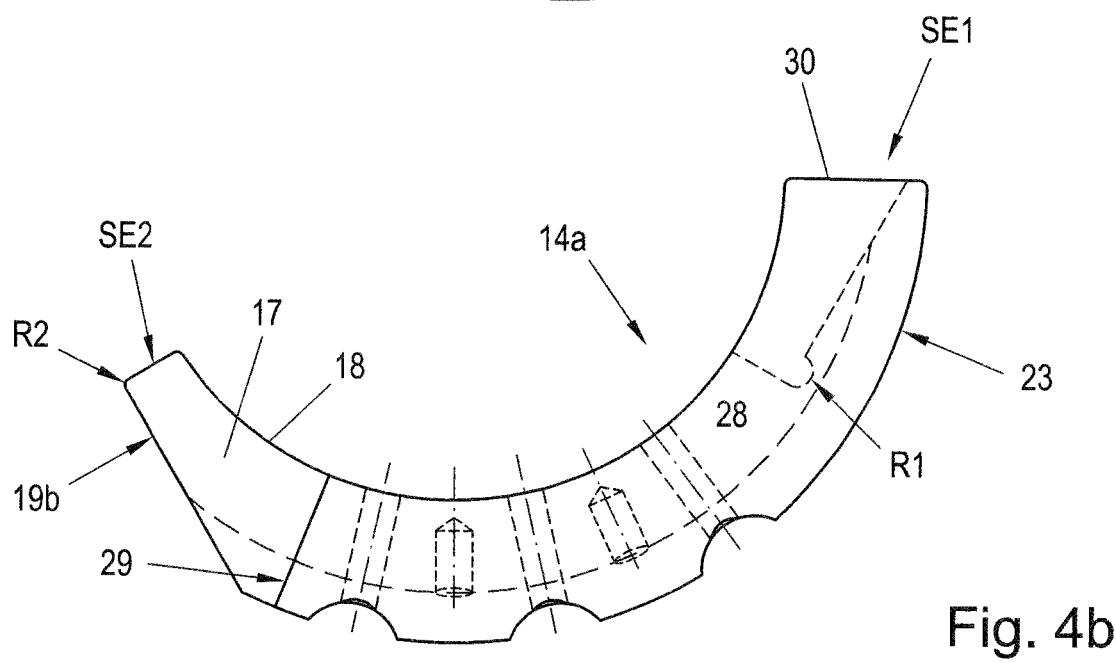

FIGS. 4a and 4b show the packing ring 14 or an individual ring segment 14a of the packing ring 14 in a top view of the second axial ring end RE2, which in the installed state faces toward the high-pressure side of the compressor. The second axial segment recess which is provided at the second segment end SE2 of a ring segment 14a in order to form the second axial contact surface 17 can be seen in particular in FIG. 4b. The second tangential contact surface 19b is provided on the outside of the second segment end SE2 in the radial direction. The second axial segment recess extends partially from the second axial ring end RE2, in particular from a preferably flat second ring end surface 28 provided thereon, axially in the direction of the first axial ring end RE1, in particular the first flat ring end surface. In addition to the second axial contact surface 17, the second axial segment recess also forms a second end surface 29 of the second segment end SE2, which is spaced apart from ring segment 14a adjacent to a first end surface 30 of the first segment end SE1 by a segment distance b, as shown in FIG. 4a. The interaction of adjacent segment ends SE1, SE2 thus creates a radial recess 31 which radially completely penetrates the packing ring 14 and is axially delimited, the width of which corresponds to the segment spacing b. With continued wear of the packing ring 14, the segment spacing b decreases in a manner analogous to the wear spacing a (see FIGS. 2+3a), until the wear distance a becomes zero (where b>a). With the same dimension a=b in the unworn (new) state of the packing ring 14, the wear distance a in the example shown, for kinematic reasons, becomes zero earlier than the segment distance b as the wear progresses. That depends essentially on the specific structural design, in particular on the arrangement of the tangential contact surfaces 19a, 19b. Alternatively, however, the end surfaces 29, 30 could also be used as the wear limit (where a>b).

The tangential contact surfaces 19a, 19b could, for example, also extend continuously from the outer circumferential surface 23 to the inner circumferential surface 18. As a result, the wear readjustment would essentially no longer be limited by the wear distance a, as shown so far. The first axial segment recess provided at the first segment end SE1 would therefore no longer have a first wear limiting surface 22 and the second segment end SE2 would no longer have a second wear limiting surface 21. In this case, the wear readjustment could be limited, for example, by the radial recess 31 at the second axial ring end RE2, the width of which corresponds to the segment spacing b, as was shown with reference to FIG. 4a.

Of course, the material and the surface properties of the packing ring 14 can also be changed in order to obtain the best possible result in an application. According to an advantageous embodiment, the packing ring 14 is produced from a suitable tribologically optimized material, for example from a polytetrafluoroethylene (PTFE) composite. The production could take place, for example, by machining, by injection molding, or also by additive methods such as 3D printing.

Figures 5A, 5B:
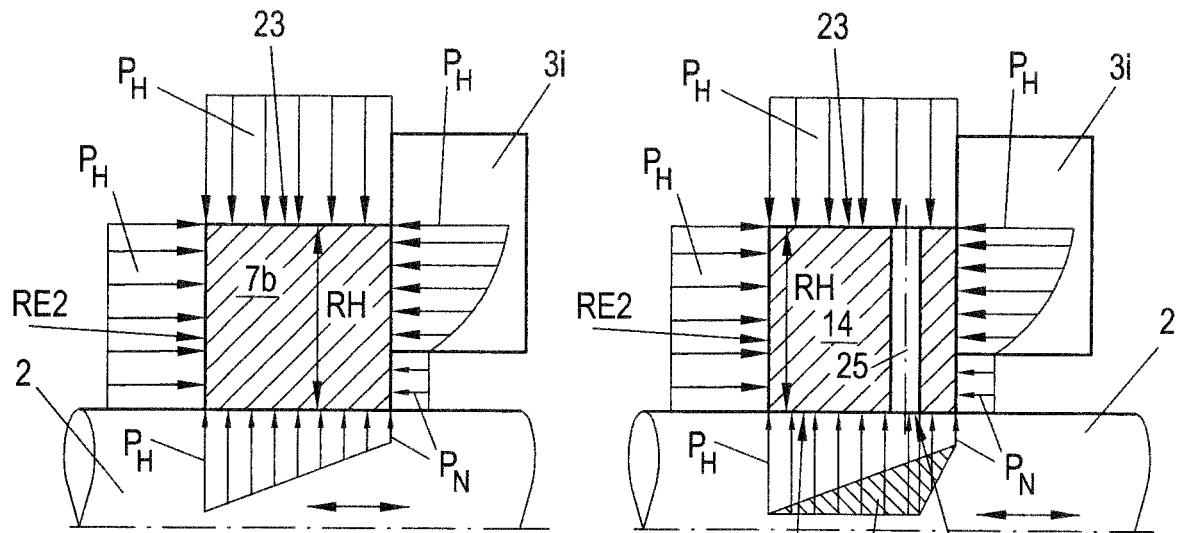
FIGS. 5a and 5b show pressure conditions on a packing ring.

In FIG. 5a, the pressure conditions on a conventional packing ring 7b (see FIG. 1) during operation of the compressor are shown schematically in simplified form on the basis of a longitudinal section. In FIG. 5b, the pressure conditions on a packing ring 14 according to the invention are shown in comparison thereto. The packing ring 14 is preferably arranged in a sealing device 1 (not shown), which is arranged, for example, in the crankcase of a compressor, in order to seal the piston rod 2 (as, for example, in FIG. 1). The packing rings 7b, 14 are arranged such that the respective first axial ring end RE1 faces toward the low-pressure side (crankcase side) and the respective second axial ring end RE2 faces toward the high-pressure side (cylinder side). The packing rings 7b, 14 are arranged such that the respective first axial ring end RE1 abuts a housing segment 3i of the sealing device 1 in order to create a seal in the radial direction between the first axial ring end RE1 and the housing segment 3i. The seal corresponds to an essentially static seal, since there is no or only a very slight relative movement between the first axial ring end RE1 of the packing ring 14 and the housing segment 3i.

The high pressure $P_H$ is applied to the radially outside outer circumferential surface 23 and the pressure $P_N$, which is lower relative thereto, is applied to the radially inside inner circumferential surface 18 at the first axial ring end RE1. The high pressure $P_H$ decreases in the radial direction to the low pressure $P_N$, wherein the pressure profile has a non-linear profile in the example shown. The high pressure $P_H$ is applied to the second axial ring end RE2 and is essentially constant over the radial ring height RH between the radially outside outer circumferential surface 23 and the radially inside inner circumferential surface 18. At this point it should be noted that the pressure on a sealing device 1 decreases in the axial direction from the high pressure $P_H$ in the cylinder to the low pressure $P_N$ in the crankcase step by step over the respective provided number of packing rings 14. This means that the pressure conditions on the packing rings 14 of a sealing device 1 generally differ, of course. The high pressure $P_H$ applied to the first packing ring 14 facing toward the cylinder therefore does not correspond to the high pressure $P_H$ applied to the following packing ring 14, etc. The high pressure $P_H$ and the low pressure $P_N$ in the description thus each refer to one packing ring 14. The low pressure $P_N$ at a packing ring 14 approximately corresponds to the high pressure $P_H$ of the respective packing ring 14 following axially (in the direction of the crankcase), etc.

Analogously to this, the high pressure $P_H$ is applied to the radially outside outer circumferential surface 23, wherein the pressure is essentially constant over the axial ring width RB of the packing ring 14 between the second axial ring end RE2 and the first axial ring end RE1. A seal between the high pressure $P_H$ at the second axial ring end RE2 (on the cylinder side) and the pressure $P_N$ lower relative thereto at the first axial ring end RE1 (on the crankcase side) is produced on the radially inside inner circumferential surface 18, which abuts the translationally oscillating piston rod 2 in operation. Due to the relative movement between the (fixed) packing ring 14 and the translationally oscillating piston rod 2, this is a dynamic seal. As indicated in FIG. 5a, a substantially linear pressure curve approximately results along the radially inside inner circumferential surface 18, wherein the pressure decreases from the high pressure $P_H$ (at the second axial ring end RE2) to the low pressure $P_N$ (at the first axial ring end RE1). In principle, the pressure drop at the inner circumferential surface 18 in the axial direction is also non-linear due to the compressibility of the gaseous medium, but in certain cases (for example minor pressure difference between high pressure $P_H$ and low pressure $P_N$ at high absolute pressures), the pressure curve can be approximated well by a linear function for the sake of simplicity, as shown. In the example shown in FIG. 5a, this means that the packing ring 7b is pressed radially more strongly against the piston rod 2 due to the greater radial pressure difference in comparison to the packing ring 14 according to the invention, which results in greater wear and is therefore disadvantageous. In addition, the packing ring 7b of FIG. 5a is pressed more strongly against the piston rod 2 in the area of the first axial ring end RE1 than at the second axial ring end RE2 because of the greater radial pressure difference in comparison to the second axial ring end RE2. This uneven pressure distribution can under certain circumstances also result in uneven wear, which is also disadvantageous.

FIG. 5b shows a packing ring 14 according to the invention, wherein the sectional view extends in the area of a relief opening 25, which is embodied here as a cylindrical bore and extends in the radial direction of the packing ring 14, in parallel to the axial ring ends RE1, RE2. As mentioned, however, at least three relief openings 25 are provided per ring segment 14a, as shown in FIG. 2, in order to make the pressure profile as uniform as possible in the circumferential direction. The pressure profiles at the axial ring ends RE1, RE2 and at the radially outside outer circumferential surface 23 are essentially identical to the conventional packing ring 7b according to FIG. 5a. The pressure profile on the dynamic sealing surface along the radially inside inner circumferential surface 18 between piston rod 2 and packing ring 14 is now deliberately influenced by the at least three relief openings 25 per ring segment 14a.

As can be seen in FIG. 5b, there is a pressure compensation between the radially outside outer circumferential surface 23 (high pressure $P_H$) and that of the radially inside inner circumferential surface 18 (low pressure $P_N$). This means that the pressure between the second axial ring end RE2 (cylinder side) and the boundary of the first relief opening end 25a of the relief opening 25 facing the first axial ring end RE1 is essentially constant. From the boundary of the first relief opening end 25a of the relief opening 25 facing toward the first axial ring end RE1 and the first axial ring end RE1, the pressure decreases from the high pressure $P_H$ to the pressure $P_N$ lower relative thereto, wherein the pressure curve is approximately linear, as has already been explained with reference to FIG. 5a.

In contrast to the packing ring 7b according to FIG. 5a, an essentially complete pressure compensation takes place on the packing ring 14 according to FIG. 5b in the area between the second axial ring end RE2 and the boundary of the first relief opening end 25a of the relief opening 25 facing toward the first axial ring end RE1 in the axial direction. The pressure difference ΔP between the pressure profile in FIG. 5a and the pressure profile in FIG. 5b is shown shaded in FIG. 5b. This means that the packing ring 14 is supported in the axial direction over a longer area than a conventional packing ring 7b because of the radial pressure compensation and is only pressed more strongly against the piston rod 2 in the area between the boundary of the first relief opening end 25a facing toward the first axial ring end RE1 and the first axial ring end RE1 due to the radial pressure difference.

In practice, the maximum possible pressure compensation is limited by the relief opening circumferential distance z of the relief opening(s) 25 from one another, by the relief opening axial distance x of the relief opening ends 25a from the first axial ring end RE1, and by the material properties of the packing ring 14. The structural design is such that the relief opening circumferential distance z between the relief openings 25 in the circumferential direction and the relief opening axial distance x between the relief bores 25 and the first axial ring end RE1 in the axial direction is selected so that, with given material, a sufficiently high strength of the packing ring 14 is ensured so that there is as little deformation and accompanying leakage as possible in the area between the first relief opening ends 25a and the first axial ring end RE1 of the packing ring 14.

To ensure this, the relief opening circumferential distance z is 1 mm (up to 15 mm), the relief opening axial distance x is 4% to 20% of the axial ring width RB, the relief opening length of the relief openings 25 (at least at the relief opening ends 25a) is preferably 2% to 100% of the ring width RB, and the axial relief opening width of the relief openings 25 (at least at the relief opening ends 25a) is preferably 2%-30% of the axial ring width RB. The axial relief opening width of the relief opening ends 25a and the relief opening axial distance x are matched to one another in such a way that in any case the condition is fulfilled, according to which the relief opening ends 25a lie decentralized between the axial ring ends RE1, RE2, i.e., closer to the first axial ring end RE1 than to the second axial ring end RE2. If the relief opening circumferential distance z were too small, the ring would be weakened too much, which can result in undesirable deformations and increased leakage. On the other hand, if the relief opening circumferential distance z were too large, the high pressure $P_H$ cannot develop completely between the relief opening ends 25a in certain circumstances. This would result in an unfavorable pressure distribution in the circumferential direction and therefore inadequate pressure compensation, which in turn can result in a higher frictional force and thus a higher degree of ring wear. Of course, the size, shape, and arrangement of the relief opening(s) 25 shown in FIG. 5b is only to be understood as an example, the specific structural design depends on the area of application of the packing ring 14 and is left to a person skilled in the art.

Figure 6:
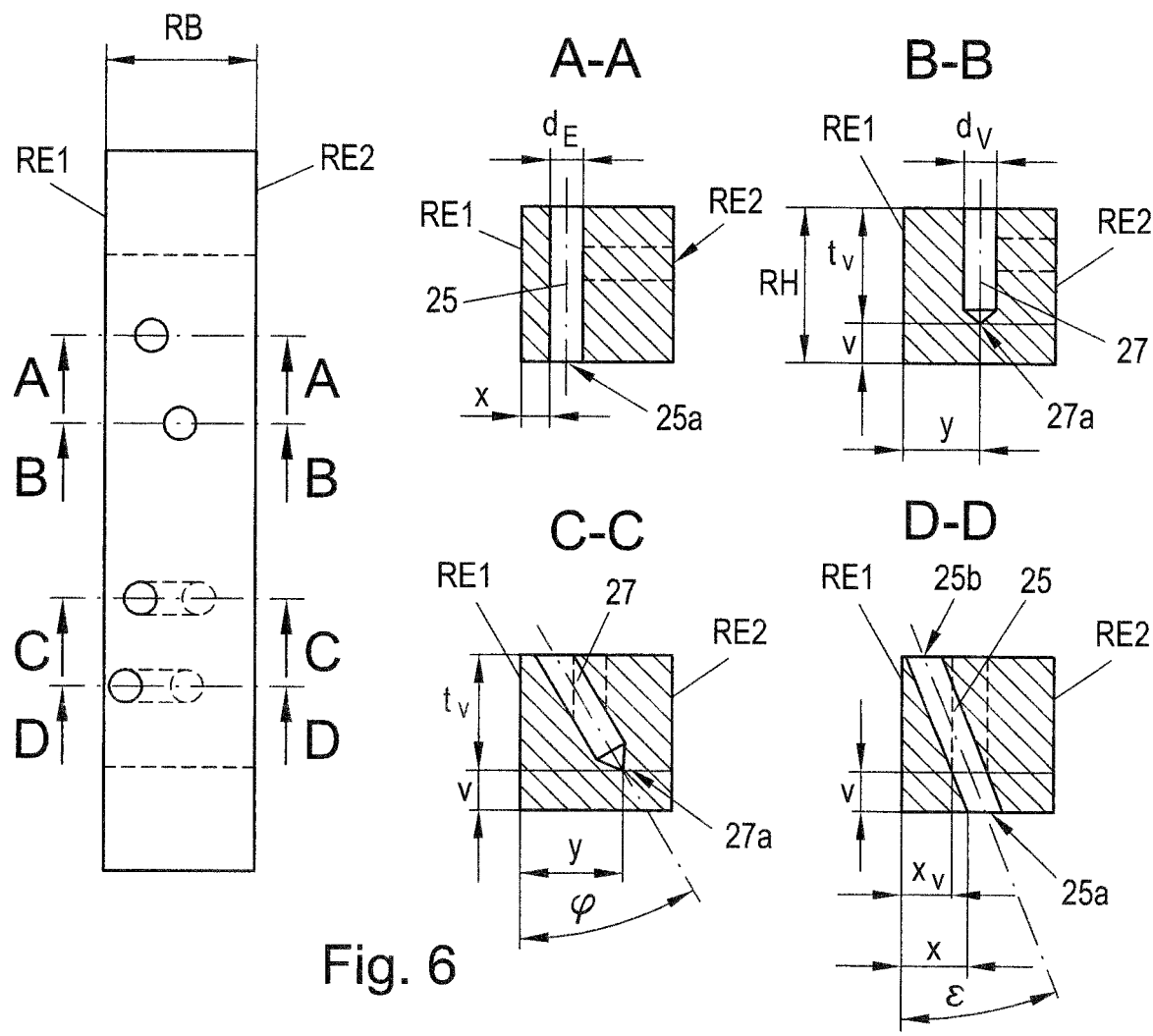
FIG. 6 shows a packing ring in a top view of the outer circumferential surface and sectional views at different positions of the packing ring, FIGS. 7a-7d each show a ring segment of the packing ring having different embodiments of compensation recesses.

In FIG. 6, various possibilities for the arrangement of the relief opening 25 and the wear opening 27 are shown by way of example on the basis of multiple longitudinal sections A-A to D-D through a packing ring 14. Section A-A shows a relief opening 25 which extends in the radial direction of the packing ring 14, that is to say essentially parallel to the two axial ring ends RE1, RE2. The relief opening 25 has a circular cross section and is spaced apart from the first axial ring end RE1 at a relief opening axial distance x, which is measured from the boundary of the first relief opening end 25a of the relief opening 25, which faces toward the first axial ring end RE1. The relief opening axial distance x depends on the area of application of the packing ring 14 and in particular the desired pressure profile on the radially inside inner circumferential surface 18 of the packing ring, as was shown with the aid of FIG. 5b. The relief opening axial distance x is 4% to 20%, preferably 4-15%, particularly preferably 4-10% of the axial ring width RB of the packing ring 14. As already mentioned, the relief opening axial distance x should not be less than a certain minimum distance in order to ensure a sufficiently high strength of the packing ring 14, wherein the minimum distance is 4% of the axial ring width RB. The relief bores 25 are therefore provided predominantly on the half of the packing ring 14 facing toward the low-pressure side if, as shown, they are embodied as continuous, radially extending bores.

If the relief opening 25 is embodied as a cylindrical bore, the relief opening diameter dE is preferably between 2-30%, preferably 2-25%, particularly preferably 2-20%, in particular at most 15% of the axial ring width RB of the packing ring 14. The relief opening 25 can, however, also have a non-circular cross section, for example an elliptical cross section or a cross section in the form of an elongated hole. In this case, the dimensions mentioned relate to the axial relief opening width of the relief opening 25.

Regardless of the cross-sectional shape and the course of the relief openings 25, it generally applies that the first relief opening ends 25a of the relief openings 25 are arranged off-center on the radially inside inner circumferential surface 18. In the axial direction, they are therefore closer to the first axial ring end RE1 than to the second axial ring end RE2. The axial relief opening width of the relief openings 25 at the first relief opening end 25a, for example the diameter in the case of a circular cross section, thus depends on the relief opening axial distance x. This means that the greater the relief opening axial distance x from the first ring end RE1, the smaller the maximum possible axial relief opening width, in order to ensure that the relief opening end 25a is closer in the axial direction to the first axial ring end RE1 than to the second axial ring end RE2.

As already mentioned and shown with reference to FIG. 2, the relief opening 25 could also have a course deviating from the radial direction of the packing ring 14, as shown in section D-D in FIG. 6. The relief opening 25 here has a circular cross section analogous to section A-A, but the relief opening 25 is inclined in the axial direction at a relief opening angle ε to the radial direction. The radially outer second relief opening end 25b of the relief opening is thus closer to the first axial ring end RE1 than the radially inner first relief opening end 25a. In the example shown, the relief opening angle ε is measured between the first axial ring end RE1 and the axis of the relief opening 25 embodied as a cylindrical bore. The relief opening axial distance x is measured as already described from the boundary of the first relief opening end 25a on the radially inside inner circumferential surface 18, which faces toward the first axial ring end RE1. The values of the relief opening axial distance x naturally relate to the new condition of the packing ring 14 without wear. The relief opening(s) 25 can, however, also in a top view (FIGS. 3+4) have a course deviating from the radial direction, that is to say be inclined, as will be explained in more detail below with reference to FIG. 8b.

Due to the inclined arrangement of at least one relief opening 25, the pressure compensation can be changed depending on the wear of the packing ring 14, since the axial position of the radially inner relief opening end 25a changes depending on the wear. In the example shown, the relief opening end 25a travels in the case of radial wear v of the packing ring 14 in the direction of the first axial ring end RE1. This means that the relief opening axial distance xv with radial wear v is less than the relief opening axial distance x in the new condition of the packing ring 14. The dimension of the relief opening axial distance xv naturally depends on the relief opening angle ε. As a result, the pressure compensation increases in the axial direction depending on the state of wear of the packing ring 14, wherein the degree of pressure compensation can be selected depending on the size of the relief opening angle ε.

A relief opening 25 does not have to be completely inclined over its entire length; in principle, it would also be sufficient in principle if only a portion of the relief opening 25 adjoining the inner circumferential surface 18 is inclined in the direction of the first axial ring end RE1. The remainder of the portion of the relief opening 25 facing the outer circumferential surface 23 could extend in parallel to the ring ends RE1, RE2, as indicated by dashed lines in section D-D. The pressure compensation of the relief opening 25 inclined in portions would thus be dependent on wear (the first relief opening end 25a travels in the direction of the first ring end RE1) until the wear v is reached and the inclined portion of the relief opening 25 has essentially completely disappeared.

With further progressing wear, the pressure compensation would remain essentially constant due to the straight (dashed) portion of the relief opening 25, since the first relief opening end 25a does not travel further in the direction of the first ring end RE1. The length of the inclined portion of the relief opening 25 in the radial direction of the packing ring 14 is preferably between 0-60% of the ring height RH, particularly preferably 40%. The entire relief opening 25 or the portion of the relief opening 25 adjoining the inner circumferential surface 18 could of course also have a completely or partially curved course instead of the straight course. The relief opening 25 or the portion of the relief opening 25 adjoining the inner circumferential surface 18 would in this case be curved in the direction of the first axial ring end RE1, so that the first relief opening end 25a travels in the direction of the first ring end RE1 depending on wear.

According to a further advantageous embodiment of the invention, as already mentioned, in addition to the relief openings 25, one or more wear opening(s) 27 can be provided on the packing ring 14, as has already been described with reference to FIG. 2. Section B-B shows a wear opening 27 in the form of a cylindrical bore with a conical base and with a wear opening diameter $d_v$. The wear opening 27 extends here in the radial direction of the packing ring 24, that is to say in the example shown in parallel to the first and second axial ring ends RE1, RE2. In contrast to the relief opening 25, however, the wear opening 27 extends from the radially outside outer circumferential surface 23 of the packing ring 14 only over part of the ring height RH in the direction of the radially inside inner circumferential surface 18, without reaching it (in the new condition, without wear). This means that the wear opening 27 only connects the radially outside outer circumferential surface 23 of the packing ring 14 to the radially inside inner circumferential surface 18 after a certain radial wear v of the packing ring. The wear opening 27 thus only contributes to pressure compensation from this state of wear v and then essentially takes on a function analogous to that of the relief openings 25.

The at least one wear opening 27 is spaced apart at a wear opening axial distance y from the first axial ring end RE1, wherein the wear opening axial distance y is measured from the point of the wear opening 27 that is closest to the inner circumferential surface 18 in the radial direction, since this point is the first exposed due to wear. This means that the wear opening 27 is not connected to the first axial ring end RE1, but only to the radially outside outer circumferential surface 23 and/or to the second axial ring end RE2. In general, the radially inner wear opening end 27a facing toward the inner circumferential surface 18 thus lies between the first and the second axial ring ends RE1, RE2. The wear opening end 27a is thus surrounded by the material of the packing ring 14, seen in the axial direction and in the circumferential direction. In the example shown (section B-B) the wear opening 27 is embodied as a bore having a conical base, the wear opening axial distance y is thus measured up to the tip of the wear opening end 27a. The wear opening axial distance y can be equal to the relief opening axial distance x, but can also be different, for example, as indicated in FIG. 6. The wear opening axial distance y is preferably between 2-20% of the axial ring width RB of the packing ring 14, particularly preferably 2-15%, in particular at most 10%.

The radial extension of the wear opening 27 starting from the radially outside outer circumferential surface 23, here the wear opening depth $t_v$ of the cylindrical bore, is selected such that the wear opening end 27a is spaced apart in the radial direction from the inner circumferential surface 18 at a distance of at most 40% of the radial ring height RH is and is advantageously selected depending on an expected wear v of the packing ring. For example, the time until a certain wear v of a certain packing ring material is reached under certain operating conditions and taking into account the surface roughness of the piston rod 2 could be determined in tests. From this it could be estimated, for example, how long (for example, many operating hours) a compressor can be operated until it reaches the wear v. The wear opening depth $t_v$ of the wear opening 27 could then be dimensioned such that the wear opening 27 connects the radially outside outer circumferential surface 23 to the radially inside inner circumferential surface 18 after a certain number of operating hours, in order to enable increased pressure compensation from this point in time.

However, at least one wear opening 27 could also be provided on the packing ring 14, at which at least an end portion facing toward the radially inside inner circumferential surface 18 is inclined in the direction of the first axial ring end RE1. Preferably, however, not only the end portion of the wear opening 27 is inclined (as indicated by dashed lines in section C-C), but the entire wear opening 27. In particular, at least one wear opening 27 can be embodied as a cylindrical bore, which extends obliquely from the radially outside outer circumferential surface 23 in the direction of the radially inside inner circumferential surface 18, as shown in section C-C in FIG. 6. The wear opening 27 is inclined here at a wear opening angle φ to the first axial ring end RE1. Analogous to the straight design (section B-B), this would result in increased pressure compensation from wear v. In addition, in the inclined variant according to section C-C, from wear v, the pressure compensation would automatically increase depending on the further progressing wear, as has already been explained with reference to the relief opening 25. The wear opening depth $t_v$ in the inclined bore does not correspond to the bore depth, but rather the maximum extension of the wear opening 27 in the radial direction, starting from the radially outside outer circumferential surface 23, as shown in section C-C.

The wear opening diameter $d_v$ of the wear opening(s) 27 (with circular cross section) can, for example, correspond to the relief opening diameter $v_E$ or be different therefrom. Likewise, the wear opening angle φ between the wear opening 27 and the first axial ring end RE1 could correspond to the relief opening angle ε or be different therefrom. This in turn depends on the boundary conditions of the use of the packing ring 14 and on the desired properties with regard to the pressure compensation to be achieved.

The relief openings 25 and/or the wear openings 27 do not necessarily have to open into the radially outside outer circumferential surface 23 of the packing ring 24, however. It would be conceivable, for example, that a relief opening 25 and/or wear opening 27 extends additionally or alternatively into the second axial ring end RE2, for example as indicated by dashed lines in section A-A for the relief opening 25 and in section B-B for the wear opening. Since the high pressure $P_H$ on the cylinder side is also applied to the second axial ring end RE2, the effect of the pressure compensation could also be implemented with a relief opening 25, which connects the radially inside inner circumferential surface 18 to the second axial ring end RE2 or to a wear opening 27, which, from a certain wear v, connects the inner circumferential surface 18 to the second axial ring end RE2. Due to the simpler production, however, it is advantageous if the relief openings 25 and/or the wear openings 27 are arranged in particular in the form of a cylindrical bore starting from the radially outside outer circumferential surface 23 of the packing ring 24 up to or in the direction of the radially inside inner circumferential surfaces 18.

According to a further advantageous embodiment of the packing ring 14, at least one compensation recess 32 can be provided on the packing ring 14, as shown in each of FIGS. 7a-7d with the aid of a ring segment 14a. The at least one compensation recess 32 extends from the radially outside outer circumferential surface 23 of the packing ring 14 over part of the ring height RH in the direction of the radially inside inner circumferential surface 18 of the packing ring 14 and from the first axial ring end RE1 over part of the ring width RB in the direction of the second axial ring end RE2. The compensation recess(es) 32 is/are essentially used to reduce the axial contact pressure and therefore the friction on the contact surface between the first axial ring end RE1 and the housing segment 3i (indicated schematically in section E-E in FIG. 7a) of the sealing device 1 during operation of the compressor.

Particularly in the case of strongly pressure-compensated packing rings 14 (e.g., large number of relief openings 25, small relief opening circumferential distance z, small relief opening axial distance x), it can happen that the packing ring 14, due to the high pressure compensation, is only pressed in operation with a relatively low resulting force radially against the piston rod 2 (see, for example, FIG. 5b). Any lateral movements of the piston rod 2 that occur during operation could, under certain circumstances, only be insufficiently followed by the packing ring 14 without a compensation recess 32 due to the friction at the contact surface between the first axial ring end RE1 and the housing segment 3i, which would result in the packing ring 14 lifting off the piston rod 2 in the radial direction and thus undesired leakages. The compensation recess 32 reduces the frictional force counteracting the lateral movement of the packing ring 14, as a result of which the packing ring 14 can better follow the movements of the piston rod 2 in the radial direction. The compensation recess(es) 32 can be designed differently, as will be described in detail below with reference to FIGS. 7a-7d, wherein in each case the ring segment 14a is shown in a top view on the left and in a sectional view corresponding to the respective line of section on the right.

Figure 7A:
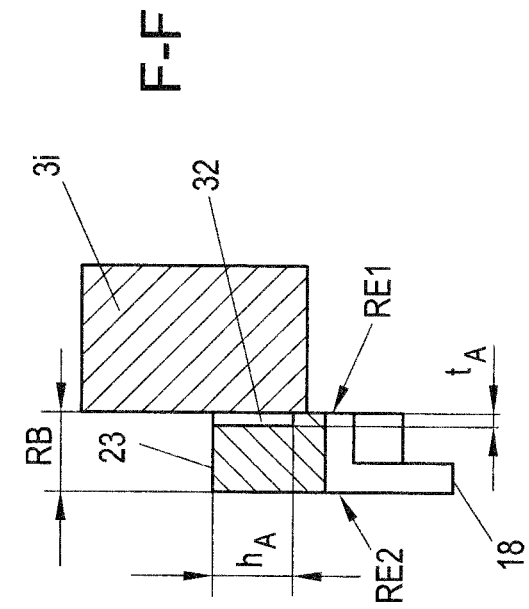
Figure 7A:
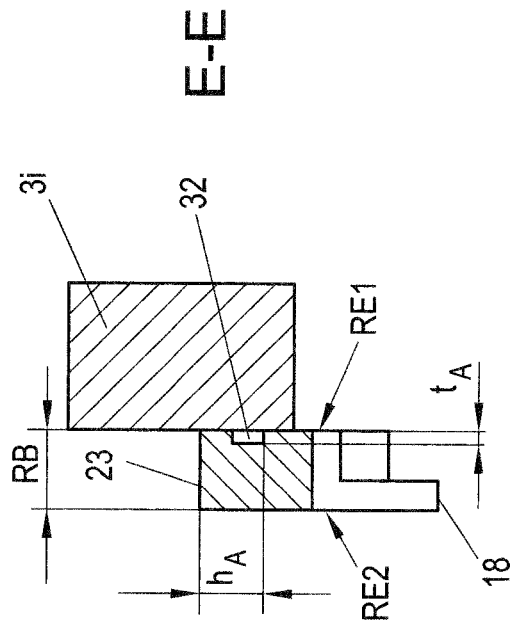

In FIG. 7a, the compensation recess 32 is formed in the form of an elongated groove of width $b_A$, which has a first compensation recess end 32a and a second compensation recess end 32b spaced apart therefrom at a certain angle in the circumferential direction, as can be seen in the illustration on the left. The maximum extension $h_A$ of the compensation recess 32 in the radial direction, which can be seen in the section E-E, is preferably 60% of the radial ring height RH. This ensures that there is still a sufficiently large static sealing surface available on the first axial ring end RE1, which is in contact with the contact surface on the housing segment 3i, in order to achieve a radial seal. The maximum extension $h_A$ of the compensation recess(es) 32 in the radial direction applies regardless of the structural design of the compensation recess(es) 32. The maximum compensation recess depth $t_A$ of the compensation recess(es) 32 in the axial direction of the packing ring 14 is between 1-40% of the ring width RB of the packing ring 14, preferably 0.5 mm, wherein this also applies regardless of the specific design (FIGS. 7a-7d) of the compensation recess 32.

Figure 7B:
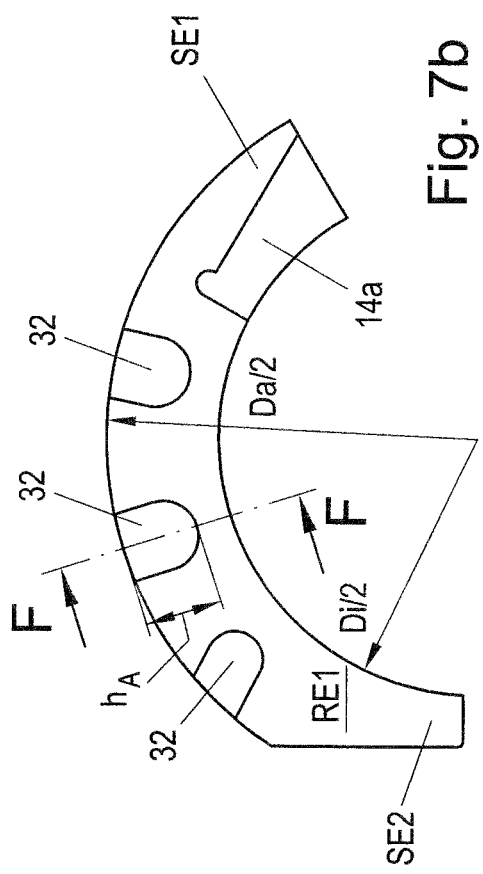
Figure 7B:
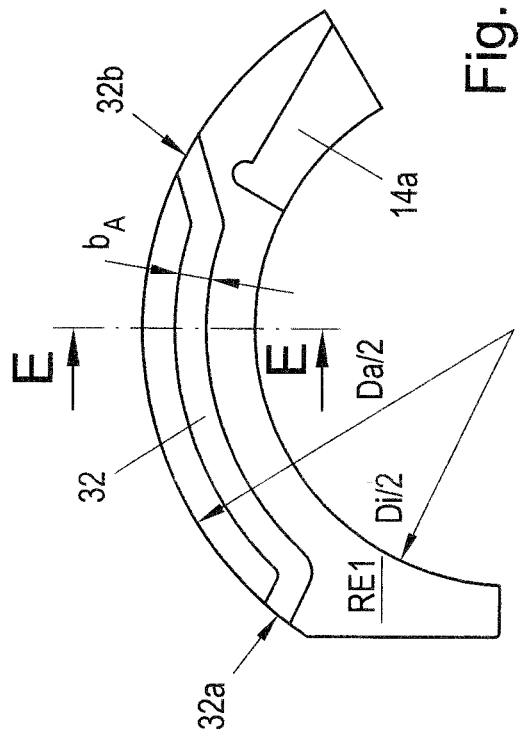

The embodiment according to FIG. 7b has multiple separate compensation recesses 32 which are spaced apart from one another in the circumferential direction, as is shown in the left top view. As a result, the compensation recesses 32 arranged on the outside in the circumferential direction (at the segment ends SE1, SE2) can, for example, be dimensioned differently than the compensation recesses 32 in between, whereby the contact pressure can be varied in the circumferential direction. The section F-F shown on the right again shows the extension $h_A$ of the corresponding compensation recess 32 in the radial direction and the compensation recess depth $t_A$.

Figure 7C:
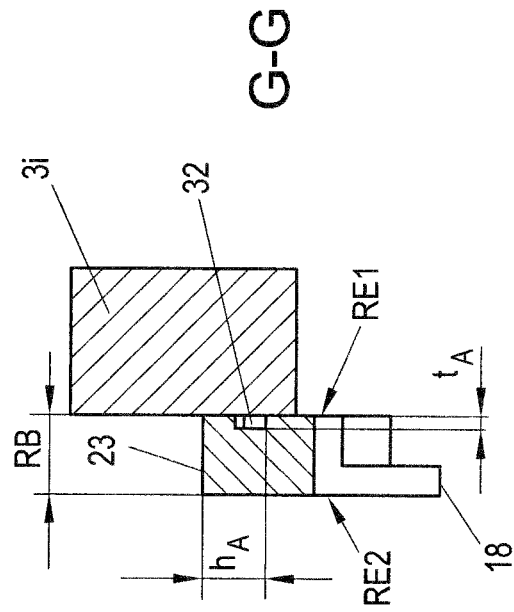
Figure 7C:
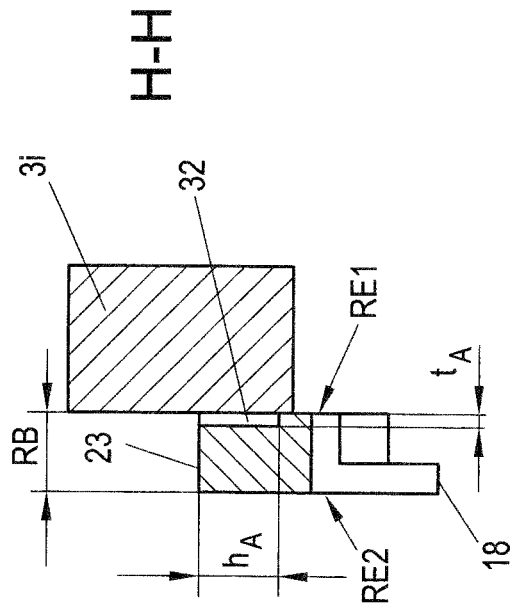
Figure 7C:
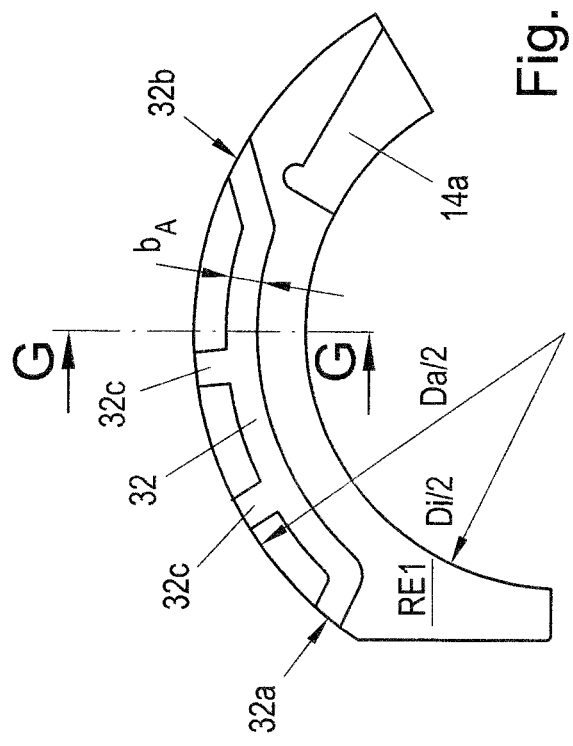

The configuration of the compensation recess 32 in FIG. 7c essentially corresponds to that in FIG. 7a, but with the difference that the compensation recess 32 has additional compensation recess openings 32c in an area lying in the circumferential direction between the first compensation recess end 32a and the second compensation recess end 32b, which connect the compensation recess 32 radially to the radially outside outer circumferential surface 23, as can be seen in the left top view. The section G-G shown on the right again shows the extension $h_A$ of the compensation recess 32 in the radial direction and the compensation recess depth $t_A$.

Figure 7D:
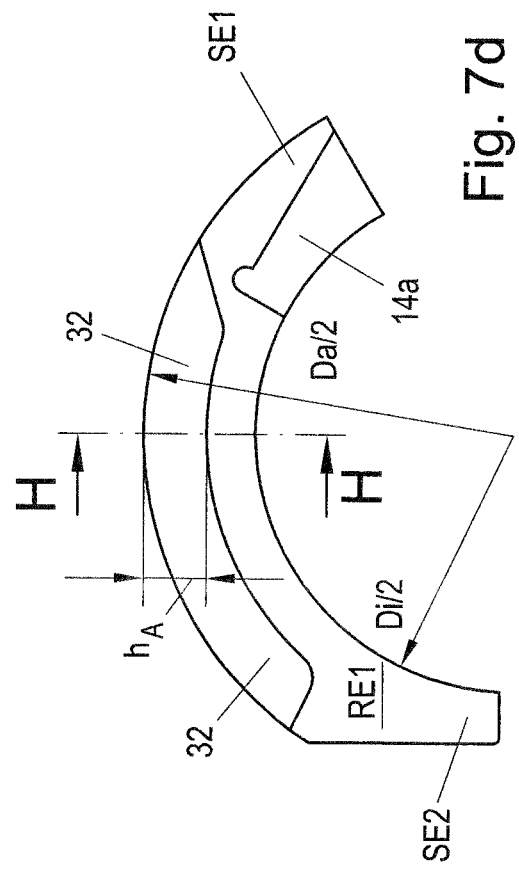

FIG. 7d shows a further embodiment of a compensation recess 32, wherein the compensation recess 32 is radially connected to the outer circumferential surface 23 of the packing ring over its entire extension in the circumferential direction, as shown in the left top view. This creates a relatively large contact surface on the housing segment 3i, on which the high pressure $P_H$ on the cylinder side can act, whereby the axial contact pressure of the packing ring 14 on the housing segment 3i can be further reduced in comparison to the variants according to FIGS. 7a-c. The section H-H shown on the right again shows the extension $h_A$ of the corresponding compensation recess 32 in the radial direction and the compensation recess depth $t_A$.

The variants shown are, of course, only examples, which are to show possible structural designs of the compensation recess(es) 32 in a nonrestrictive manner. A person skilled in the art can of course also provide other embodiments of the compensation recess(es) 32.

In FIGS. 8a-d, a further advantageous embodiment of the packing ring 14 according to the invention is shown by way of example on the basis of a ring segment 14a. As already adequately described, multiple relief openings 25 are provided on the packing ring 14, four relief openings 25 per ring segment 14a here, which are each spaced apart from one another by a relief opening circumferential distance z. The relief opening circumferential distance z does not have to be equal between all relief openings 25 (as shown), but could also be different, for example.

According to a further advantageous embodiment of the invention, at least one startup recess 33 is provided on the radially inside inner circumferential surface 18 of at least one ring segment 14a of the packing ring 14. The at least one startup recess 33 extends in the axial direction of the ring segment 14a from the second axial ring end RE2 over part of the ring width RB in the direction of the first axial ring end RE1. In the radial direction of the ring segment 14a, the startup recess 33 extends from the radially inside inner circumferential surface 18 of the ring segment 14a by a small part of the ring height RH in the direction of the radially outside outer circumferential surface 23 of the ring segment 14a. The startup recess 33 is spaced apart from the respective segment ends SE1, SE2 in the circumferential direction. FIG. 8d shows an isometric view of the ring segment 14a, wherein the startup recess 33 is clearly visible. In the example shown, only one startup recess 33 is provided on the ring segment 14a, but of course several startup recesses 33, which are smaller in relation to the startup recess 33 shown, could be provided next to one another on the ring segment 14a, spaced apart from one another in the circumferential direction.

The arrangement of a startup recess 33 is used in particular in the case of strongly pressure-compensated packing rings 14 (e.g., large number of relief openings 25, small relief opening circumferential distance z, and small relief opening axial distance x). With such packing rings 14, increased leakage can occur when the compressor starts up from standstill, since the radial contact pressure with which the packing ring 14 is pressed against the piston rod 2 may, under certain circumstances, not be sufficient to compensate for manufacturing-related tolerance errors or any burrs on the packing ring 14 and/or on the piston rod 2. As a result of the arrangement of at least one startup recess 33, at the beginning of the startup phase, the packing ring 14 abuts a startup surface 34 on the piston rod 2, which is relatively small compared to the entire radially inside inner circumferential surface 18. As a result, the pressure-related surface pressure on the startup surface 34 at the beginning of the startup phase is increased, which results in an improved sealing effect and therefore less leakage. In this context, the startup phase is not only to be understood as the initial start of the piston compressor, but also every start from standstill (at least as long as a startup surface 34 is present). The at least one startup recess 33 is preferably dimensioned such that the remaining startup surface 34 of a ring segment 14a is between 25% and 75% of the inner circumferential surface 18 of the ring segment 14a, preferably 60%. If multiple startup recesses 33 are arranged on the ring segment 14a, the area ratio relates to the sum of the individual areas of the startup recesses 33 in relation to the inner circumferential surface 18 of the ring segment 14a. In FIG. 8a, a ring segment 14a of the packing ring 14 is shown in a view normal to the radially inside inner circumferential surface 18. Starting from the second axial ring end RE2, at which the high pressure $P_H$ on the cylinder side is applied during operation of the piston compressor, the startup recess 33 extends over part of the ring width RB in the direction of the first axial ring end RE1, at which the pressure $P_N$ lower relative thereto prevails during operation. The startup recess width $b_{AL}$ in the axial direction of the packing ring 14 is preferably 30% to 90% of the axial ring width RB, in particular 65%, in order to develop a sufficiently high effect during the startup of the compressor. Furthermore, the first relief opening ends 25a of the relief openings 25 can be seen in FIG. 8a, which are each spaced from one another in the circumferential direction at the relief opening circumferential distance z (measured from the boundaries of the relief opening ends 25a facing toward one another).

FIG. 8b shows a radial section through the ring segment 14a according to the section line I-I of FIG. 8a. FIG. 8c shows a longitudinal section through the ring segment 14a according to the section line J-J of FIG. 8b. In FIG. 8c, the radial startup recess depth $t_{AL}$, which is relatively small in comparison to the radial ring height RH, can be seen, which moves in the range between 1 and at most 3% of the radial ring height RH, particularly preferably 2%. Due to the relatively small startup recess depth $t_{AL}$, the startup behavior is improved as described, without the behavior of the packing ring 14 fundamentally changing during the normal operation of the compressor. The startup recess 33 is therefore not a circumferential groove in the conventional sense which connects the relief openings 25 and therefore makes no or a negligibly small contribution to pressure compensation when the compressor is in operation. After the wear of the startup surface 34, the packing ring 14 behaves like a ring without a startup recess 33. In the context of the invention, the direct opening of the relief opening ends 25a of the relief openings 25 into the radially inside inner circumferential surface 18 is thus also to be understood as opening into the startup recess 33. The pressure conditions shown with reference to FIG. 5b are therefore also substantially valid for a packing ring 14 having a startup recess 33. If multiple startup recesses 33 are provided on a packing ring 14, for example one startup recess 33 per ring segment 14a (as shown) or multiple startup recesses 33 per ring segment 14a, these can also be embodied differently. For example, the startup recesses 33 can have different radial startup recess depths $t_{AL}$ and/or different shapes and/or different startup recess widths $b_{AL}$ in the axial direction in order to be able to make the startup behavior of the packing ring 14 even more variable. The boundary conditions, in particular with regard to the remaining startup surface 34, however, remain the same. Because of manufacturing, the startup recess(es) 33 can also have a certain radius at the edges under certain circumstances, which results, for example, from the geometry of a tool used, for example a milling cutter.

In section I-I in FIG. 8b, relief openings 25 and wear openings 27 are again shown in different variants. The relief opening 25-1, which is arranged at the second segment end SE2 of the ring segment 14a, differs here from the remaining three relief openings 25-2. The relief openings 25-2 are embodied as cylindrical through bores and have a course in the radial direction of the packing ring 14 or here the ring segment 14a. The relief openings 25-2 are thus not arranged inclined (for example, as in FIGS. 2-4), and thus have a relief opening angle ε=0. The relief openings 25-2 thus extend in parallel to the first and second ring ends RE1, RE2, as can be seen in FIG. 8c.

The relief opening 25-1, which is arranged at the second segment end SE2 of the ring segment 14a, extends here in a direction deviating from the radial direction of the ring segment 14a. In contrast to the relief openings 25 (FIG. 2+section D-D in FIG. 6) inclined only at a first relief opening angle ε in the axial direction, the relief opening 25-1 is arranged so that it does lie in the plane of section shown in FIG. 8b, thus in parallel to the first and second ring end RE1, RE2, but deviates from the radial direction at a second relief opening angle ω in this sectional plane. This essentially means that the second relief opening end 25-1b, which opens into the radially outside outer circumferential surface 23 of the packing ring 14, is circumferentially spaced apart from the first relief opening end 25-1a, which opens into the inside inner circumferential surface 18, as shown in FIG. 8b.

The distance between the relief opening ends 25-1a, 25-1b results from the relief opening angle ω and the outer diameter Da of the packing ring 14 as ω*Da. This inclined arrangement of the relief opening 25-1 also enables pressure compensation in a portion of the inner circumferential surface 18 lying close to the second segment end SE2. Such a pressure compensation would be impossible or difficult to implement with a radial relief opening 25 analogous to the relief openings 25-2 due to the overlapping of the segment ends SE2, SE1 of two adjoining ring segments 14a. Of course, it would also be conceivable that one or more relief opening(s) 25 are provided on a packing ring 14 or a ring segment 14a, which are arranged deviating from the radial direction both at a first relief opening angle ε and at a second relief opening angle ω. This means that the first relief opening end 25a could be spaced apart from the second relief opening end 25b both in the axial direction and in the circumferential direction.

The two wear openings 27 extend here in the radial direction of the ring segment 14a. As can be seen in FIG. 8b, the two wear openings 27 extend with a different depth $t_{v1} > t_{v2}$ from the radially outside outer circumferential surface 23 of the packing ring 14 in the direction of the radially inside inner circumferential surface 18. In the event of wear v=RH-$t_{v1}$, the wear opening 27 having the depth $t_{v1}$ is first exposed and as wear progresses v=RH-$t_{v2}$, the wear opening 27 having the depth $t_{v2}$ is exposed. In this way, an essentially two-stage increase of the pressure compensation is achieved. Of course, more or fewer wear openings 27 and/or relief openings 25 could also provided. One or more wear opening(s) 27 could also be arranged inclined to the radial direction of the packing ring 14 at a first wear opening angle φ, additionally or alternatively to the different depth $t_v$ (see section C-C in FIG. 6) and/or at a second wear opening angle λ (not shown), analogous to the second relief opening angle ω, as was shown in FIG. 8b.

Depending on the application, the embodiments of the invention shown can of course be combined as desired in order to achieve a desired result, in particular a desired pressure compensation of the packing ring 14. At least one packing ring 14 according to the invention is preferably arranged in a sealing device 1 of a piston compressor shown in FIG. 1, particularly preferably multiple packing rings 14 according to the invention in succession in the axial direction.

Finally, it should again be pointed out that the features described and shown of the embodiments illustrated in FIGS. 1-8d are to be considered independently of one another and of course can also be used alone or in any combination. For example, a packing ring 14 does not necessarily have to have relief openings 25 and wear openings, as shown in FIG. 2. In the simplest case, the packing ring 14 according to the invention could have three relief openings 25 of any shape on at least one ring segment 14a, which extend from the inner circumferential surface 18 to the outer circumferential surface 23 and/or extend to the second axial ring end RE2 of the ring segment 14a, wherein the first relief opening ends 25a are spaced apart from one another on the inner circumferential surface 18 at a certain relief opening circumferential distance z and are spaced apart at a relief opening axial distance x from the first axial ring end RE1, which is 4% to 20% of the axial ring width RB of the ring segment 14a. Optionally, one or more relief openings 25 could be embodied as inclined and/or one or more wear openings 27 could be provided, one or more of which can also be inclined. Furthermore, one or more compensation recesses 32 and/or startup recesses 33 could optionally be provided on the packing ring 14.

The invention claimed is:

1. A packing ring comprising:
   a first axial ring end;
   a second axial ring end;
   at least three ring segments, each of the at least three ring segments having a first segment end and a second segment end in a circumferential direction,
   the first segment end including a first tangential contact surface and a first axial contact surface, the first axial contact surface facing towards the first axial ring end, and
   the second segment end including a second tangential contact surface and a second axial contact surface, the second axial contact surface facing towards the second axial ring end, wherein the first tangential contact surface of each ring segment abuts the second tangential contact surface of the ring segment adjoining in the circumferential direction for creating a radial seal of the packing ring and the first axial contact surface of each ring segment abuts and the second axial contact surface of a ring segment adjoining in the circumferential direction for creating an axial seal of the packing ring;
   at least three relief openings provided on at least one ring segment, the at least three relief openings extending from a radially inside inner circumferential surface of the ring segment to a radially outside outer circumferential surface and/or to the second axial ring end of the ring segment;
   wherein the at least three relief openings each have a first relief opening end opening into the radially inside inner circumferential surface of the ring segment;
   wherein the first relief opening ends of two relief openings arranged adjacent to one another in the circumferential direction are spaced apart from one another at a relief opening circumferential distance, characterized in that the first relief opening ends are closer in the axial direction to the first axial ring end than to the second axial ring end and are spaced apart at a relief opening axial distance from the first axial ring end, which is 4% to 20% of the axial ring width of the ring segment.

2. The packing ring of claim 1, wherein the relief opening circumferential distance is 1 mm to 15 mm.

3. The packing ring of claim 1, wherein the relief opening circumferential distance is equal between all relief openings of a ring segment.

4. The packing ring of claim 1, wherein the at least three relief openings, at least at a relief opening end, which opens into the radially inside inner circumferential surface of the ring segment, each of the at least three relief openings have a relief opening length in the circumferential direction which is 2-100% of the axial ring width of the packing ring.

5. The packing ring of claim 1, wherein at least a portion of at least one relief opening adjoining the radially inside inner circumferential surface of the packing ring is inclined or curved in the direction of the first axial ring end.

6. The packing ring of claim 1, wherein at least one relief opening of the at least three relief openings includes a first relief opening end that opens into the radially inside inner circumferential surface of the ring segment is spaced apart in the circumferential direction from a second relief opening end of the relief opening into the radially outside outer circumferential surface of the packing ring.

7. The packing ring of claim 1, further including at least one axial groove which extends from the first axial ring end to the second axial ring end, and is provided on the radially outside outer circumferential surface of at least one ring segment of the at least three ring segments.

8. The packing ring one of claim 1, wherein the at least three relief openings, at least at the relief opening ends thereof, each have an axial relief opening width which is 2-30%, of the axial ring width of the packing ring.

9. The packing ring of claim 8, wherein at least one relief opening has a straight course and a constant circular cross section having a relief opening diameter which is 2-30%, of the axial ring width of the packing ring.

10. The packing ring of claim 1, further including at least one wear opening on at least one ring segment, the at least one wear opening extends from the radially outside outer circumferential surface and/or the second axial ring end of the ring segment in the direction of the radially inside inner circumferential surface of the ring segment, wherein a radially inner wear opening end of the at least one wear opening facing toward the inner circumferential surface is spaced apart in the radial direction of the ring segment from the radially inside inner circumferential surface of the ring segment at a distance which is at most 40% of a radial ring height extending between the outside outer circumferential surface and the radially inside inner circumferential surface of the ring segment,
   wherein the wear opening end lies between the first and the second axial ring ends and is spaced apart from the first and second axial ring ends.

11. The packing ring of claim 10, further including at least an end section facing toward the radially inside inner circumferential surface of at least one wear opening and is inclined in the direction of the first axial ring end.

12. The packing ring of claim 10, wherein the at least one wear opening has a straight course and a constant circular cross section with a wear opening diameter, which is 2-60%, of the axial ring width of the packing ring.

13. The packing ring of claim 10, wherein the at least one wear opening is spaced apart from the first axial ring end at a wear opening axial distance in the axial direction which is 2% to 20% of the axial ring width.

14. The packing ring of claim 1, further including at least one compensation recess on at least one ring segment of the at least three ring segments, and which recess extends from the radially outside outer circumferential surface of the ring segment in the direction of the radially inside inner circumferential surface of the ring segment and extends from the first axial ring end in the direction of the second axial ring end.

15. The packing ring of claim 1, further including
at least one startup recess on the radially inside inner circumferential surface of at least one ring segment of the at least three ring segments, and which recess extends in the axial direction of the ring segment from the second axial ring end in the direction of the first axial ring end and in the radial direction of the ring segment from the radially inside inner circumferential surface of the ring segment in the direction of the radially outside outer circumferential surface of the ring segment,
wherein the at least one startup recess forms a smaller startup surface relative to the entire radially inside inner circumferential surface,
wherein the at least one startup recess has a radial startup recess depth of at most 3% of the ring height, and
wherein the first relief opening ends of the at least three relief openings open into the startup recess until wear of the startup surface and open into the radially inside inner circumferential surface after wear of the startup surface.

16. A sealing device for sealing a translationally oscillating piston rod, the sealing device comprising:
a housing in which a number of packing rings are arranged axially in succession are provided, and
at least one packing ring according to claim 1.

17. A piston compressor comprising:
a compressor housing;
at least one cylinder housing arranged on the compressor housing;
a piston configured and arranged to translationally oscillate within the at least one cylinder housing;
a crankshaft;
a piston rod that connects the piston to the crankshaft; and
at least one packing ring of claim 1 configured and arranged to seal the piston rod.

18. The piston compressor according to claim 17, further including a sealing device having a housing provided in the compressor housing, in which the at least one packing ring includes a number of packing rings arranged axially in succession, and
wherein at least one packing ring of the number of packing rings is the packing ring according to claim 1.

* * * * *